US012597231B2

(12) United States Patent
Ohashi

(10) Patent No.: US 12,597,231 B2
(45) Date of Patent: Apr. 7, 2026

(54) INFORMATION PROCESSING DEVICE AND INFORMATION PROCESSING METHOD

(71) Applicant: SONY GROUP CORPORATION, Tokyo (JP)

(72) Inventor: Takeshi Ohashi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 475 days.

(21) Appl. No.: 18/006,925

(22) PCT Filed: Jul. 29, 2021

(86) PCT No.: PCT/JP2021/028212
§ 371 (c)(1),
(2) Date: Jan. 26, 2023

(87) PCT Pub. No.: WO2022/038991
PCT Pub. Date: Feb. 24, 2022

(65) Prior Publication Data
US 2023/0290113 A1 Sep. 14, 2023

(30) Foreign Application Priority Data

Aug. 17, 2020 (JP) ................................. 2020-137410

(51) Int. Cl.
*G06V 10/147* (2022.01)
*G01S 7/497* (2006.01)
(Continued)

(52) U.S. Cl.
CPC .............. *G06V 10/761* (2022.01); *G06T 7/73* (2017.01); *G06T 17/00* (2013.01); *G06V 10/143* (2022.01);
(Continued)

(58) Field of Classification Search
CPC .. G06V 10/761; G06V 10/143; G06V 10/147; G06V 10/25; G06T 7/73;
(Continued)

(56) References Cited

U.S. PATENT DOCUMENTS

2009/0010633 A1 1/2009 Strandemar et al.
2016/0063711 A1* 3/2016 Ogasawara ............ H04N 23/11
348/164
(Continued)

FOREIGN PATENT DOCUMENTS

JP 2018-119942 A 8/2018
JP 2018-156408 A 10/2018
(Continued)

OTHER PUBLICATIONS

International Search Report and Written Opinion of PCT Application No. PCT/JP2021/028212, issued on Oct. 19, 2021, 09 pages of ISRWO.

*Primary Examiner* — Andrew M Moyer
*Assistant Examiner* — Dylan John Mendez Muniz
(74) *Attorney, Agent, or Firm* — CHIP LAW GROUP

(57) ABSTRACT

Provided is an information processing device that includes an image acquisition unit, a measurement unit, and a recognition processing unit. The image acquisition unit acquires an image by receiving external light by a light receiving unit. The measurement unit measures a distance to a subject by using a first image based on the image acquired by the image acquisition unit in response to emission of infrared light from a light emitting unit. The recognition processing unit performs subject recognition processing by using a second image based on an image acquired by the image acquisition unit that has received external light without infrared light emitted from the light emitting unit.

9 Claims, 16 Drawing Sheets

(51) Int. Cl.

| | |
|---|---|
| *G01S 17/894* | (2020.01) |
| *G06T 7/73* | (2017.01) |
| *G06T 17/00* | (2006.01) |
| *G06V 10/143* | (2022.01) |
| *G06V 10/25* | (2022.01) |
| *G06V 10/74* | (2022.01) |
| *H04N 23/11* | (2023.01) |

(52) U.S. Cl.

CPC .... *H04N 23/11* (2023.01); *G06T 2207/10048* (2013.01); *G06T 2207/20044* (2013.01)

(58) Field of Classification Search

CPC ........... G06T 17/00; G06T 2207/10048; G06T 2207/20044; H04N 23/11; G01S 7/4802; G01S 17/894; G01S 7/497

See application file for complete search history.

(56) References Cited

U.S. PATENT DOCUMENTS

| | | | |
|---|---|---|---|
| 2017/0272651 A1* | 9/2017 | Mathy | ................... H04N 5/2226 |
| 2020/0043198 A1* | 2/2020 | Guo | ........................... G06T 7/97 |

FOREIGN PATENT DOCUMENTS

| | | |
|---|---|---|
| WO | 2015/011869 A1 | 1/2015 |
| WO | 2015/104870 A1 | 7/2015 |
| WO | 2017/150246 A1 | 9/2017 |

* cited by examiner

Figure 5:
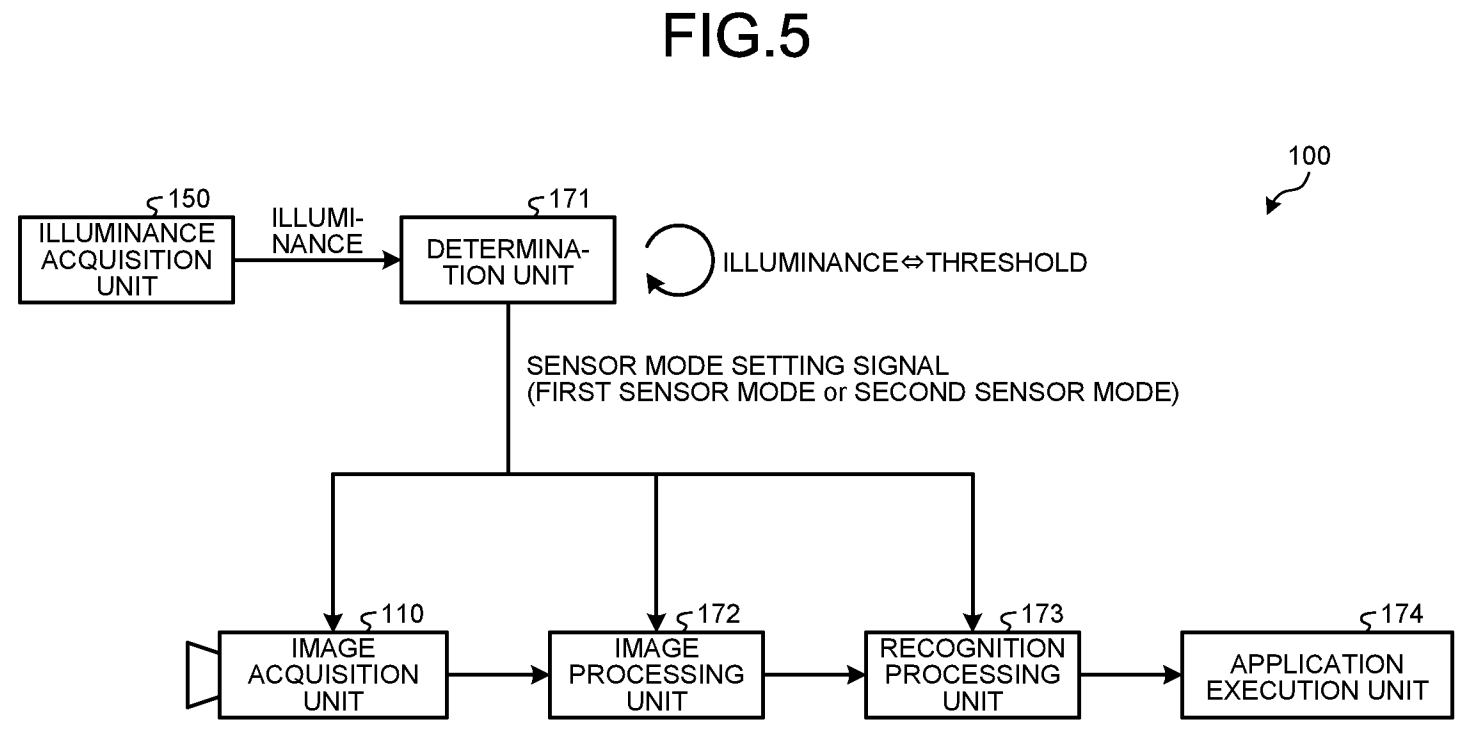

ILLUMINANCE ⇔ THRESHOLD

| 150 | 171 |
|---|---|
| ILLUMINANCE ACQUISITION UNIT | DETERMINA-TION UNIT |

ILLUMI-NANCE

SENSOR MODE SETTING SIGNAL
(FIRST SENSOR MODE or SECOND SENSOR MODE)

| 110 | 172 | 173 | 174 |
|---|---|---|---|
| IMAGE ACQUISITION UNIT | IMAGE PROCESSING UNIT | RECOGNITION PROCESSING UNIT | APPLICATION EXECUTION UNIT |

FIG.6

$I_0$(0 DEGREES)

$I_{90}$(90 DEGREES)

$I_{180}$(180 DEGREES)

$I_{270}$(270 DEGREES)

FIG.8

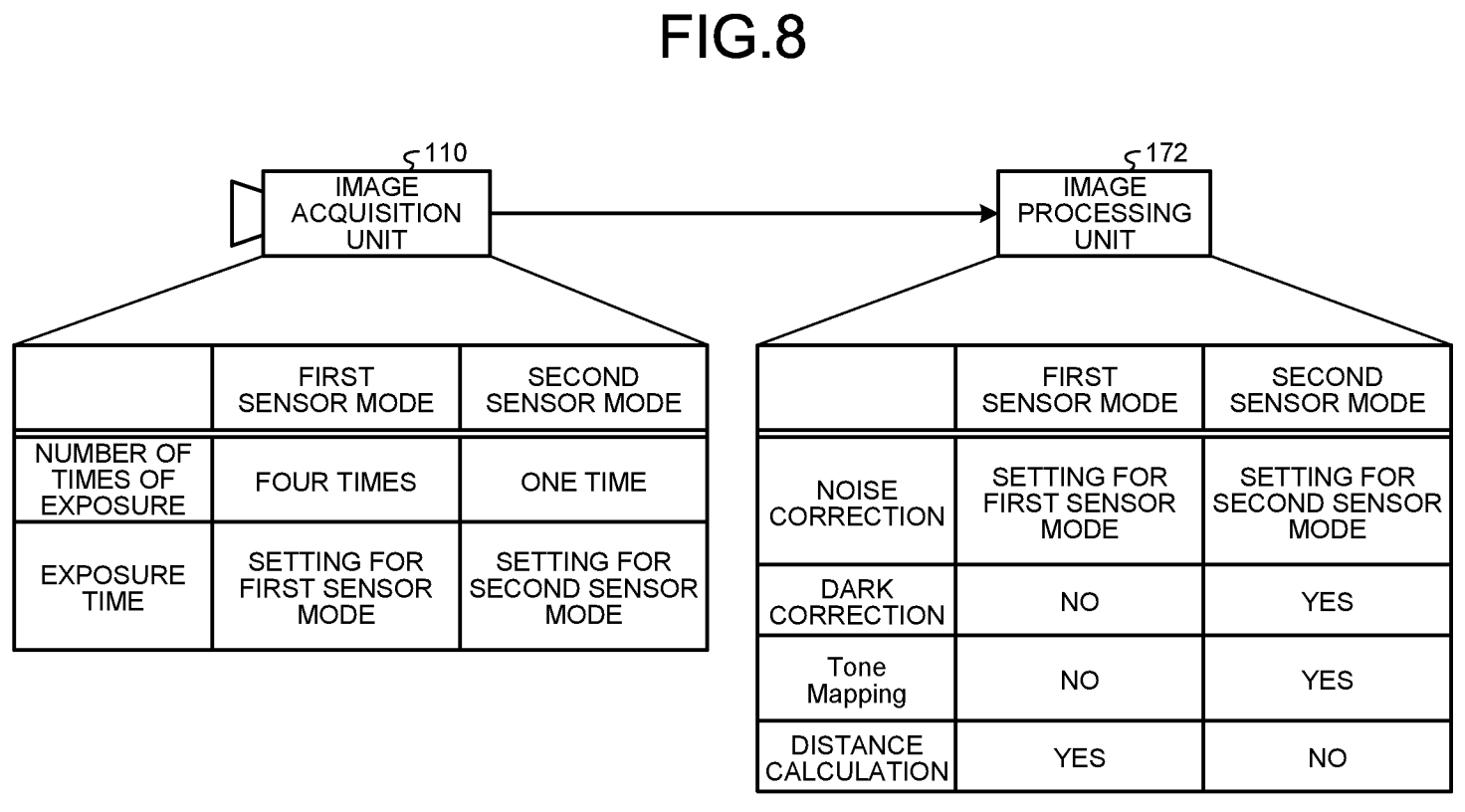

110 IMAGE ACQUISITION UNIT

| | FIRST SENSOR MODE | SECOND SENSOR MODE |
|---|---|---|
| NUMBER OF TIMES OF EXPOSURE | FOUR TIMES | ONE TIME |
| EXPOSURE TIME | SETTING FOR FIRST SENSOR MODE | SETTING FOR SECOND SENSOR MODE |

172 IMAGE PROCESSING UNIT

| | FIRST SENSOR MODE | SECOND SENSOR MODE |
|---|---|---|
| NOISE CORRECTION | SETTING FOR FIRST SENSOR MODE | SETTING FOR SECOND SENSOR MODE |
| DARK CORRECTION | NO | YES |
| Tone Mapping | NO | YES |
| DISTANCE CALCULATION | YES | NO |

Figure 10:
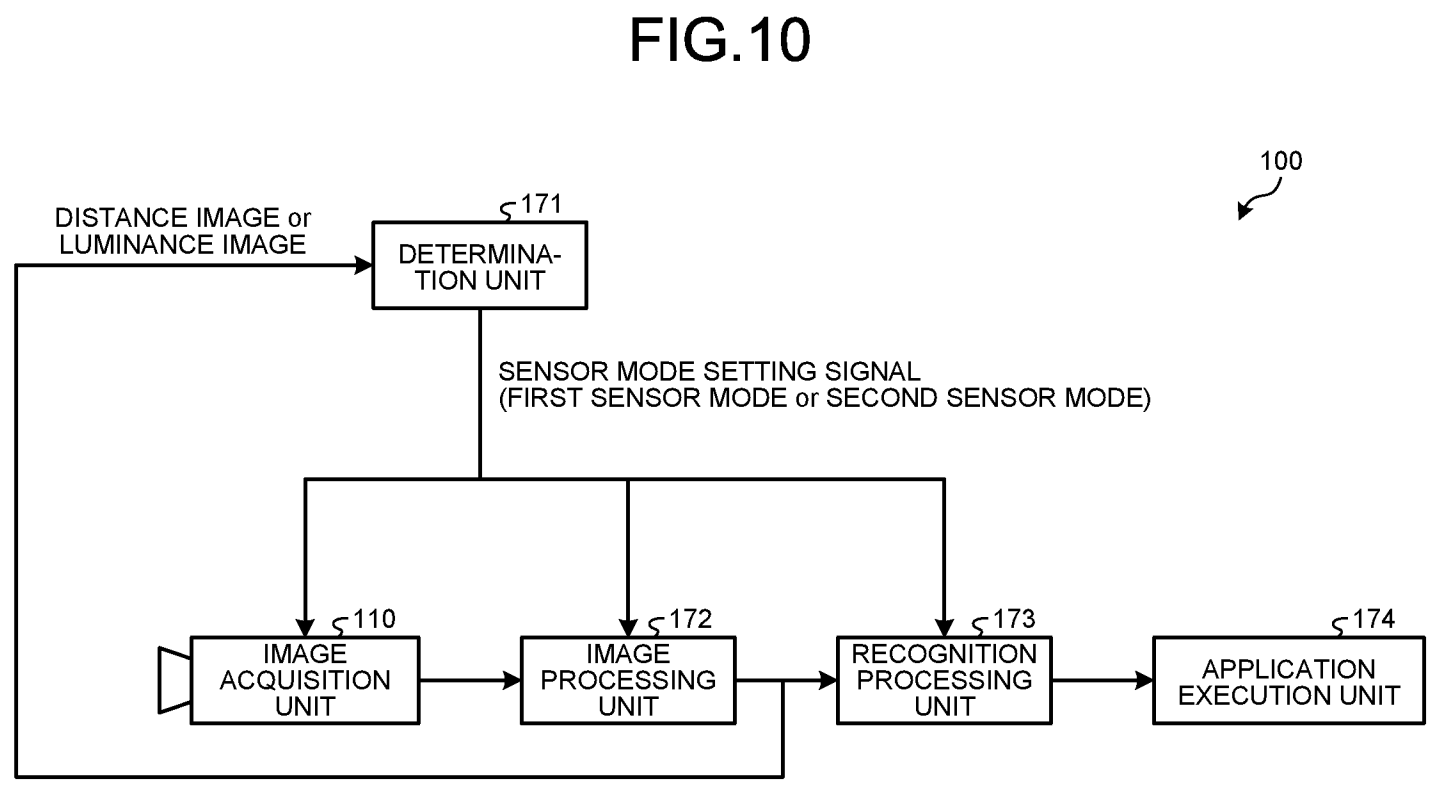

DISTANCE IMAGE or LUMINANCE IMAGE

171
DETERMINA-TION UNIT

SENSOR MODE SETTING SIGNAL
(FIRST SENSOR MODE or SECOND SENSOR MODE)

110
IMAGE ACQUISITION UNIT

172
IMAGE PROCESSING UNIT

173
RECOGNITION PROCESSING UNIT

174
APPLICATION EXECUTION UNIT

Figure 11:
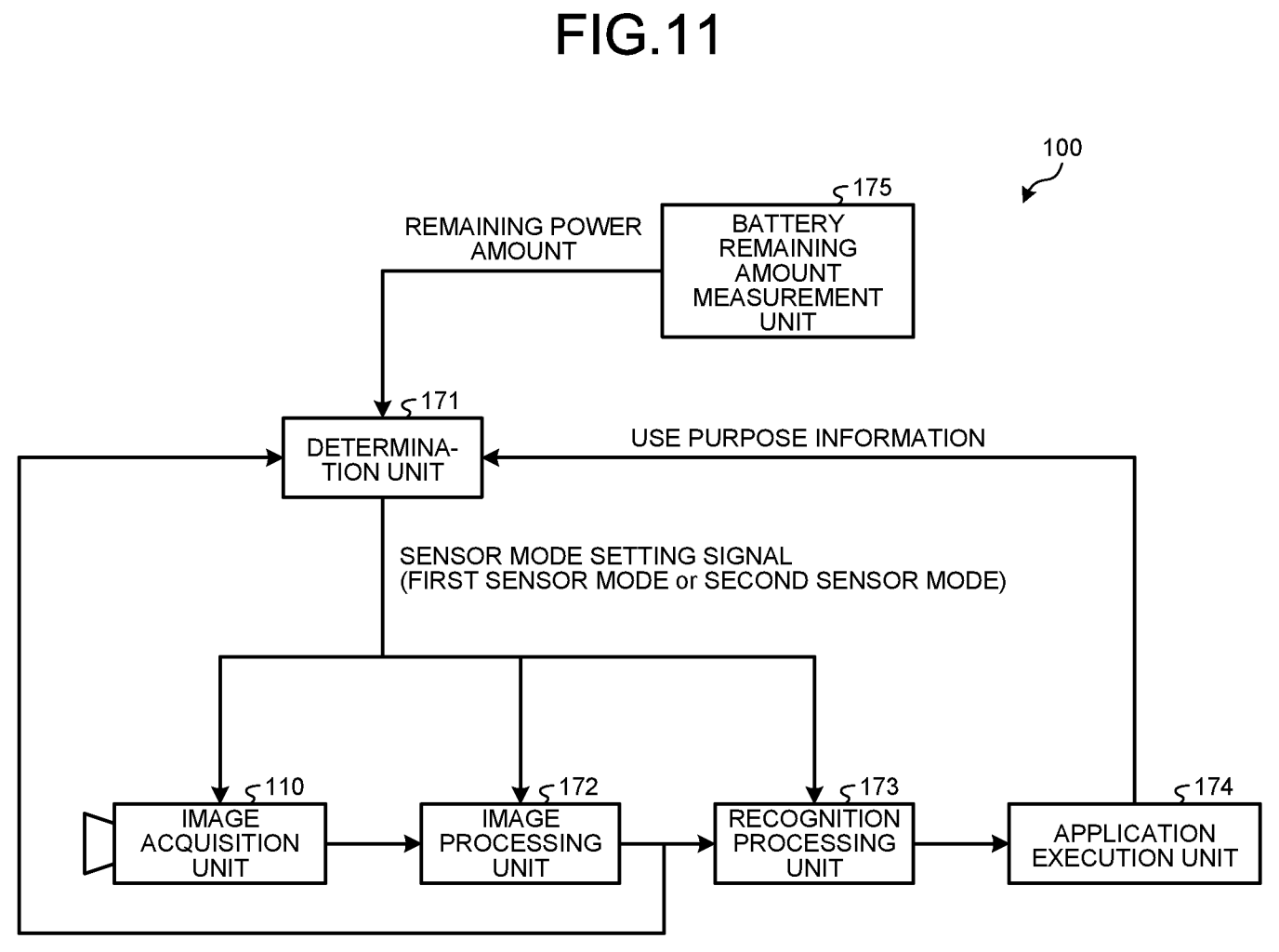

BATTERY REMAINING AMOUNT MEASUREMENT UNIT   175

REMAINING POWER AMOUNT

USE PURPOSE INFORMATION

DETERMINA-TION UNIT   171

SENSOR MODE SETTING SIGNAL (FIRST SENSOR MODE or SECOND SENSOR MODE)

IMAGE ACQUISITION UNIT   110

IMAGE PROCESSING UNIT   172

RECOGNITION PROCESSING UNIT   173

APPLICATION EXECUTION UNIT   174

BLACK POINT:FEATURE POINT OF WHICH DISTANCE INFORMATION IS OBTAINED
WHITE POINT:FEATURE POINT OF WHICH DISTANCE INFORMATION IS NOT OBTAINED

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2021/028212 filed on Jul. 29, 2021, which claims priority benefit of Japanese Patent Application No. JP 2020-137410 filed in the Japan Patent Office on Aug. 17, 2020. Each of the above-referenced applications is hereby incorporated herein by reference in its entirety.

FIELD

The present disclosure relates to an information processing device, an information processing method, and an information processing program.

BACKGROUND

Hitherto, a time-of-flight (TOF) camera (distance image sensor) has been known as a technology for analyzing an image of a subject to acquire a distance to the subject. The TOF camera can determine the distance to the subject by pulse-modulating invisible light such as infrared light to irradiate a region within an angle of view and measuring a phase delay of reflected light reflected from the subject. The TOF camera is used for three-dimensional image recognition processing in a smartphone, a wearable device, or the like for its convenience.

CITATION LIST

Patent Literature

Patent Literature 1: WO 2017/150246 A

SUMMARY

Technical Problem

However, in the image recognition processing using the TOF camera, it is difficult to obtain a sufficient recognition result in an environment where an influence of external light is strong. This is because of a low external light resistance of the TOF camera.

Therefore, the present disclosure proposes an information processing device, an information processing method, and an information processing program capable of improving image processing using a TOF camera.

Solution to Problem

To solve the problems described above, an information processing device according to an embodiment of the present disclosure includes an image acquisition unit, a measurement unit, and a recognition processing unit. The image acquisition unit acquires an image by receiving external light by a light receiving unit. The measurement unit measures a distance to a subject by using a first image based on an image acquired by the image acquisition unit in response to emission of infrared light from a light emitting unit. The recognition processing unit performs subject recognition processing by using a second image based on an image acquired by the image acquisition unit that has received external light without the infrared light emitted from the light emitting unit.

BRIEF DESCRIPTION OF DRAWINGS

FIG. 1 is a diagram illustrating an outline of information processing according to an embodiment of the present disclosure.

FIG. 5 is a diagram illustrating an outline of an operation of a determination unit according to an embodiment of the present disclosure.

FIG. 6 is an explanatory diagram for describing an example of a distance measurement method according to an embodiment of the present disclosure.

FIG. 8 is a diagram illustrating a list of function examples related to a first sensor mode and a second sensor mode according to an embodiment of the present disclosure.

FIG. 10 is a diagram illustrating an outline of an operation of the determination unit according to a modified example.

FIG. 11 is a diagram illustrating an outline of an operation of the determination unit according to the modified example.

DESCRIPTION OF EMBODIMENTS

Figure 2:
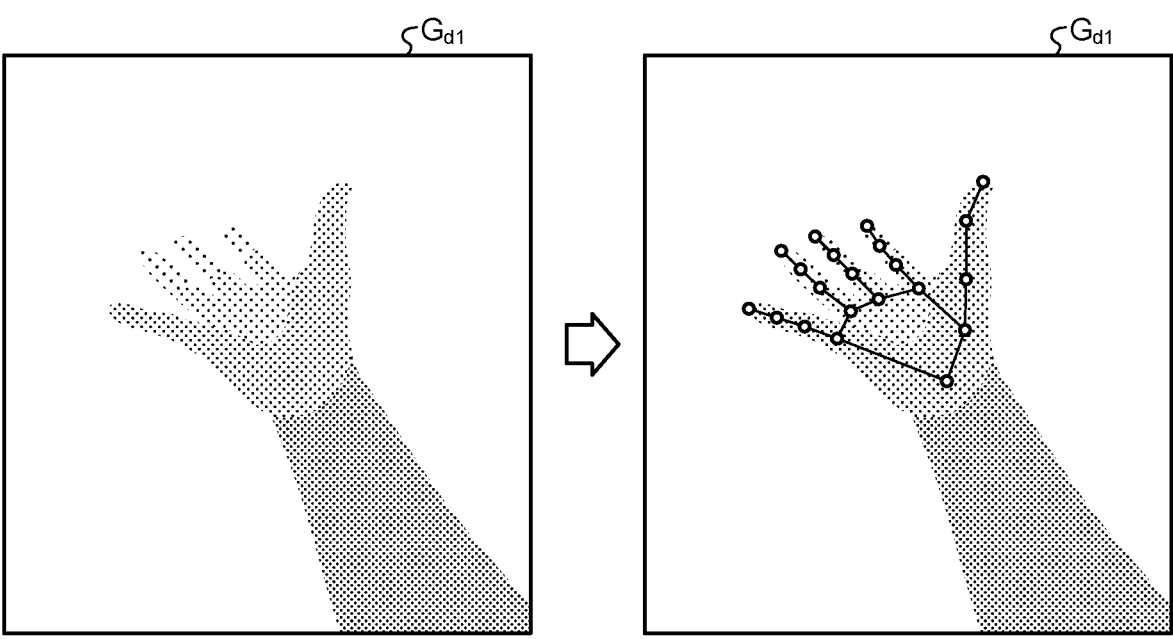
FIG. 2 is a diagram illustrating an example of a distance image according to an embodiment of the present disclosure.

Hereinafter, embodiments of the present disclosure will be described in detail with reference to the drawings. Note that in each of the following embodiments, the same reference numerals or signs denote the same portions, and an overlapping description may be omitted. Further, in the present specification and the drawings, a plurality of components having substantially the same functional configuration may be distinguished by adding different numbers or signs after the same reference numerals or signs.

Further, the present disclosure will be described in the following order.

1. Outline of Information Processing According to Embodiment of Present Disclosure
2. Device Configuration Example
3. Processing Procedure Example
4. Modified Examples
4-1. Determination of Operation Mode Based on Luminance Value of Image
4-2. Determination Based on Remaining Power Amount and Use Purpose of Recognition Result
4-3. Hybrid Use Example (1)
4-4. Hybrid Use Example (2)
5. Others
6. Hardware Configuration Example
7. Conclusion

1. OUTLINE OF INFORMATION PROCESSING ACCORDING TO EMBODIMENT OF PRESENT DISCLOSURE

Figure 1:
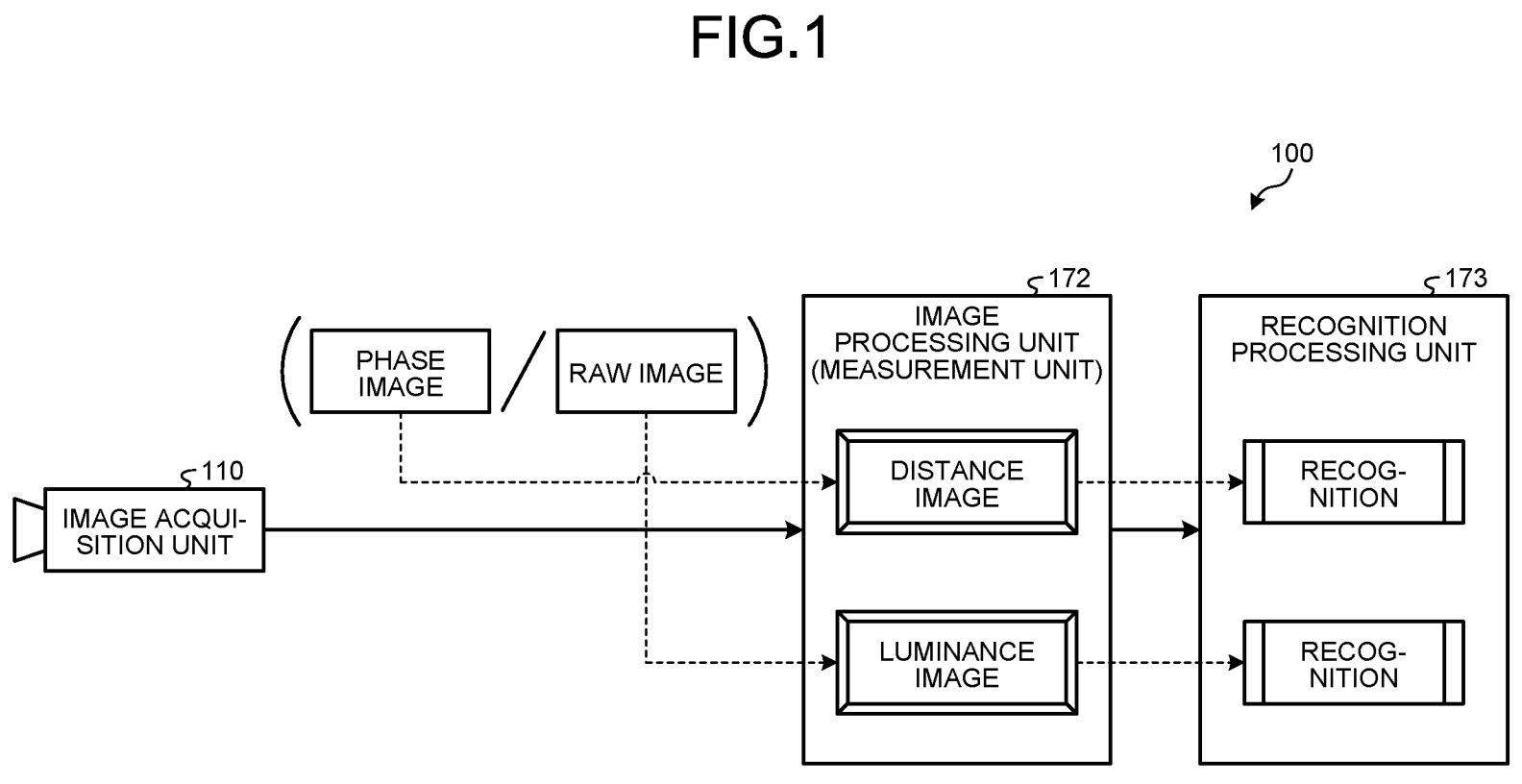

An outline of information processing according to an embodiment of the present disclosure will be described. FIG. 1 is a diagram illustrating an outline of information processing according to an embodiment of the present disclosure.

As illustrated in FIG. 1, an information processing device 100 according to an embodiment of the present disclosure is a device that acquires an image and performs processing based on a recognition result of the acquired image. The information processing device 100 is typically an electronic device such as a smartphone. The information processing device 100 may be a mobile phone, a tablet PC, a wearable terminal, a personal digital assistant (PDA), a personal computer, or the like. The information processing device 100 includes an image acquisition unit 110, an image processing unit 172, and a recognition processing unit 173.

The image acquisition unit 110 acquires an image by receiving external light by a light receiving unit. Here, the external light includes not only sunlight outdoors but also illumination light and the like whose intensity exceeds a certain threshold even indoors. The image acquisition unit 110 is implemented by a time-of-flight (TOF) camera including a light emitting unit including a laser such as a light emitting diode (LED) and a light receiving unit including a charge coupled device (CCD) image sensor or the like.

The image acquisition unit 110 acquires an image according to any one of a first sensor mode and a second sensor mode in which the information processing device 100 operates. The first sensor mode is a sensor mode conventionally included in the TOF camera functioning as the image acquisition unit 110, and is a sensor mode in which light (infrared light) is emitted from the light emitting unit to acquire an image. The second sensor mode is a sensor mode newly introduced into the TOF camera functioning as the image acquisition unit 110, and is a sensor mode in which an image is acquired without light (infrared light) emitted from the light emitting unit.

In the first sensor mode, the image acquisition unit 110 emits light (infrared light) from the light emitting unit while changing a phase, and acquires a plurality of phase images obtained by recording a light reception signal (intensity and wavelength) of light received (detected) by the light receiving unit for each pixel. Furthermore, in the second operation mode, the image acquisition unit 110 acquires a raw image obtained by recording a light reception signal of light received by the light receiving unit for each pixel without light (infrared light) emitted from the light emitting unit.

Figure 3:
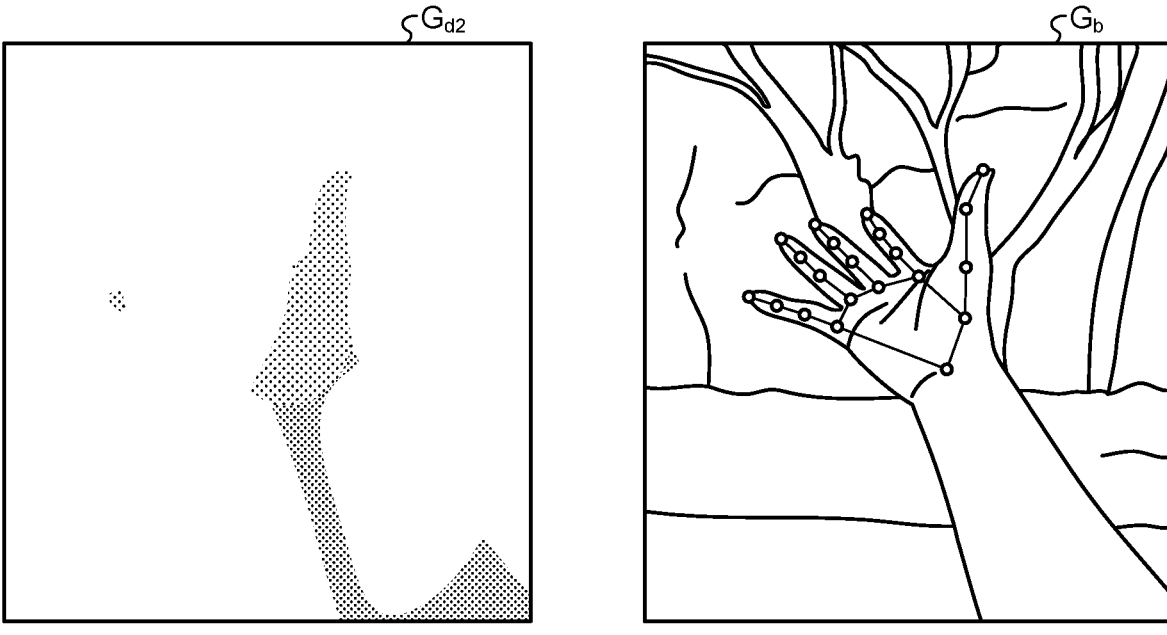
FIG. 3 is a diagram illustrating an example of the distance image and a luminance image according to an embodiment of the present disclosure.

An image processing unit 162 performs image processing on the image acquired by the image acquisition unit 110. In the first sensor mode, the image processing unit 162 measures a distance to a subject by using a distance image (an example of a first image) based on images (phase images) acquired by the image acquisition unit 110 in response to emission of infrared light from the light emitting unit. Furthermore, in the second sensor mode, the image processing unit 162 acquires a luminance image (an example of a second image) based on an image (raw image) acquired by the image acquisition unit 110 that has received external light without infrared light emitted from the light emitting unit. FIG. 2 is a diagram illustrating an example of the distance image according to an embodiment of the present disclosure. FIG. 3 is a diagram illustrating an example of the distance image and the luminance image according to an embodiment of the present disclosure. Note that the left and right sides of FIG. 3 are images obtained by capturing the same subject (user's hand).

For example, in an environment where the intensity of light emitted from a light source outside the information processing device 100 is not high, such as under the sunlight or illumination, infrared light emitted from the light emitting unit is not inhibited by external light. Therefore, the infrared light emitted from the light emitting unit can be captured by the light receiving unit, and as illustrated on the left side of FIG. 2, the image processing unit 172 can generate a distance image $G_{d1}$ from phase images acquired by the image acquisition unit 110. Then, the image processing unit 172 can recognize, by using the distance image $G_{d1}$, the shape of a user's hand that is the subject as illustrated on the right side of FIG. 2.

On the other hand, in an environment where an influence of external light is large, the infrared light emitted from the light emitting unit is inhibited. Therefore, for example, as illustrated on the left side of FIG. 3, a region where the distance cannot be measured may be generated in a part of a distance image $G_{d2}$ acquired by the image acquisition unit 110 in response to emission of the infrared light from the light emitting unit. Therefore, the information processing device 100 performs control to operate in the second sensor mode. That is, as illustrated on the right side of FIG. 3, the image processing unit 172 generates a luminance image $G_b$ from an image (for example, a raw image) acquired by the image acquisition unit 110 that has received external light without the infrared light emitted from the light emitting unit. Then, the image processing unit 172 can acquire, by using the luminance image $G_b$, two-dimensional position information of a user's hand that is the subject as illustrated on the right side of FIG. 3. In this way, in an environment where the influence of external light is large, distance information (also referred to as "distance coordinates" or "depth") to a subject cannot be acquired, but at least two-dimensional position information of the subject can be acquired.

In the first sensor mode, the recognition processing unit 173 performs recognition processing based on a distance image $G_d$ acquired by the image processing unit 172. Furthermore, in the second sensor mode, the recognition processing unit 173 performs the recognition processing based on the luminance image $G_b$ acquired by the image processing unit 172.

In this manner, the information processing device 100 according to an embodiment introduces the second operation mode in which the image is acquired without light (infrared light) emitted from the light emitting unit. Then, the information processing device 100 performs the recognition processing based on the luminance image acquired in the second operation mode. As a result, the information processing device 100 according to an embodiment can perform the recognition processing using the luminance image in an environment where the influence of external light is large, and can thus improve image processing using a TOF distance image sensor.

2. DEVICE CONFIGURATION EXAMPLE

Figure 4:
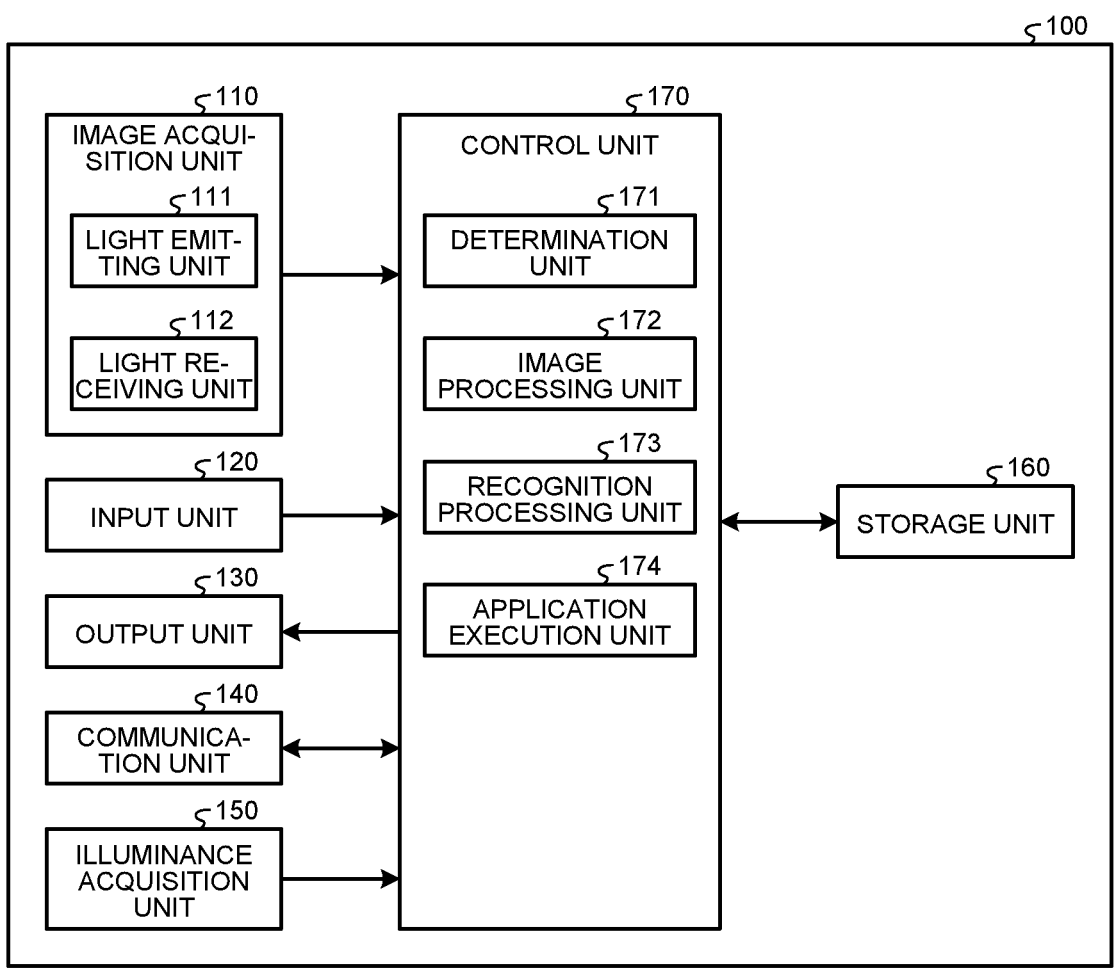
FIG. 4 is a block diagram illustrating an example of a configuration of an information processing device according to an embodiment of the present disclosure.

A configuration of the information processing device 100 according to the embodiment of the present disclosure will be described below. FIG. 4 is a block diagram illustrating an example of the configuration of the information processing device according to the embodiment of the present disclosure.

As illustrated in FIG. 4, the information processing device 100 includes the image acquisition unit 110, an input unit 120, an output unit 130, a communication unit 140, an illuminance acquisition unit 150, a storage unit 160, and a control unit 170.

The image acquisition unit 110 includes a light emitting unit 111 and a light receiving unit 112. The image acquisition unit 110 acquires an image by receiving external light by the light receiving unit 112. The image acquisition unit 110 can be implemented by, for example, a TOF camera. In the example illustrated in FIG. 4, the TOF camera functioning as the image acquisition unit 110 incorporates an LED functioning as the light emitting unit 111, a CCD image sensor functioning as the light receiving unit 112, and the like.

In a case where the information processing device 100 operates in the first sensor mode, the image acquisition unit 110 emits light (infrared light) from the light emitting unit, and acquires phase images obtained by recording a light reception signal (intensity and wavelength) of the light received (detected) by the light receiving unit for each pixel. Furthermore, in a case where the information processing device 100 operates in the second operation mode, the image acquisition unit 110 acquires a raw image obtained by recording a light reception signal of light received by the light receiving unit for each pixel without light (infrared light) emitted from the light emitting unit. In a case where a sensor mode setting signal acquired from a determination unit 171 to be described later is a signal instructing the operation in the first sensor mode, the image acquisition unit 110 acquires the phase images. On the other hand, in a case where the sensor mode setting signal acquired from the determination unit 171 to be described later is a signal instructing the operation in the second sensor mode, the image acquisition unit 110 acquires the raw image.

The input unit 120 serves as a user interface and receives an operation from a user of the information processing device 100. The input unit 120 can be implemented by, for example, various buttons, a keyboard, a touch panel, a mouse, a switch, a microphone, or the like.

The output unit 130 outputs various types of information. The output unit 130 can be implemented by a display device such as a cathode ray tube (CRT), a liquid crystal display (LCD), or an organic light emitting diode (OLED) that displays various types of information, or an acoustic device such as a speaker that outputs sound or the like.

The communication unit 140 transmits and receives various types of information. The communication unit 140 can be implemented by a network interface card (NIC), various communication modems, or the like.

The illuminance acquisition unit 150 acquires an illuminance of external light. The illuminance acquisition unit 150 can be implemented by, for example, an illuminance sensor.

The storage unit 160 stores programs, data, and the like for implementing various processing functions executed by the control unit 170. The storage unit 160 is implemented by, for example, a semiconductor memory element such as a random access memory (RAM) or a flash memory, or a storage device such as a hard disk or an optical disk. The programs stored in the storage unit 160 include an operating system (OS) and an application program. The storage unit 160 may function as an auxiliary storage device of the control unit 170. In this case, the storage unit 160 can temporarily store a phase image or a raw image acquired by the image acquisition unit 110, the distance image or the luminance image acquired by the image processing unit 172 to be described later, and the like.

The control unit 170 is, for example, a controller that controls various processings performed by the information processing device 100. Various functions provided by the control unit 170 are implemented by, for example, a processor or the like executing a program (For example, an information processing program according to the present disclosure) stored inside the information processing device 100 using a main storage device or the like as a work area. The processor can be implemented by a central processing unit (CPU), a micro processing unit (MPU), a system-on-a-chip (SoC), or the like. The various functions provided by the control unit 170 are implemented by, for example, an integrated circuit such as an application specific integrated circuit (ASIC) or a field programmable gate array (FPGA).

As illustrated in FIG. 4, the control unit 170 includes the determination unit 171, the image processing unit 172, the recognition processing unit 173, and an application execution unit 174.

The determination unit 171 determines whether or not to perform measurement processing based on the distance image. For example, the information processing device 100 is initially set to select the first sensor mode at the time of activation. Then, after the activation of the information processing device 100, the determination unit 171 determines in which of the first sensor mode and the second sensor mode the information processing device 100 is to operate. FIG. 5 is a diagram illustrating an outline of an operation of the determination unit according to an embodiment of the present disclosure.

As illustrated in FIG. 5, the determination unit 171 determines whether or not to perform the measurement processing based on an illuminance acquired by the illuminance acquisition unit 150. The illuminance acquired by the illuminance acquisition unit 150 corresponds to an illuminance of external light received by the light receiving unit 112. For example, in a case where the illuminance acquired by the illuminance acquisition unit 150 is less than a predetermined threshold, the determination unit 171 determines to perform the measurement processing. Then, the determination unit 171 transmits a sensor mode setting signal indicating the operation in the first sensor mode to the image acquisition unit 110, the image processing unit 172, and the recognition processing unit 173. On the other hand, in a case where the illuminance of the external light received by the light receiving unit 112 is equal to or higher than a predetermined threshold, the determination unit 171 determines not to perform the measurement processing. Then, the determination unit 171 transmits a sensor mode setting signal indicating the operation in the second sensor mode to the image acquisition unit 110, the image processing unit 172, and the recognition processing unit 173.

Figure 6:
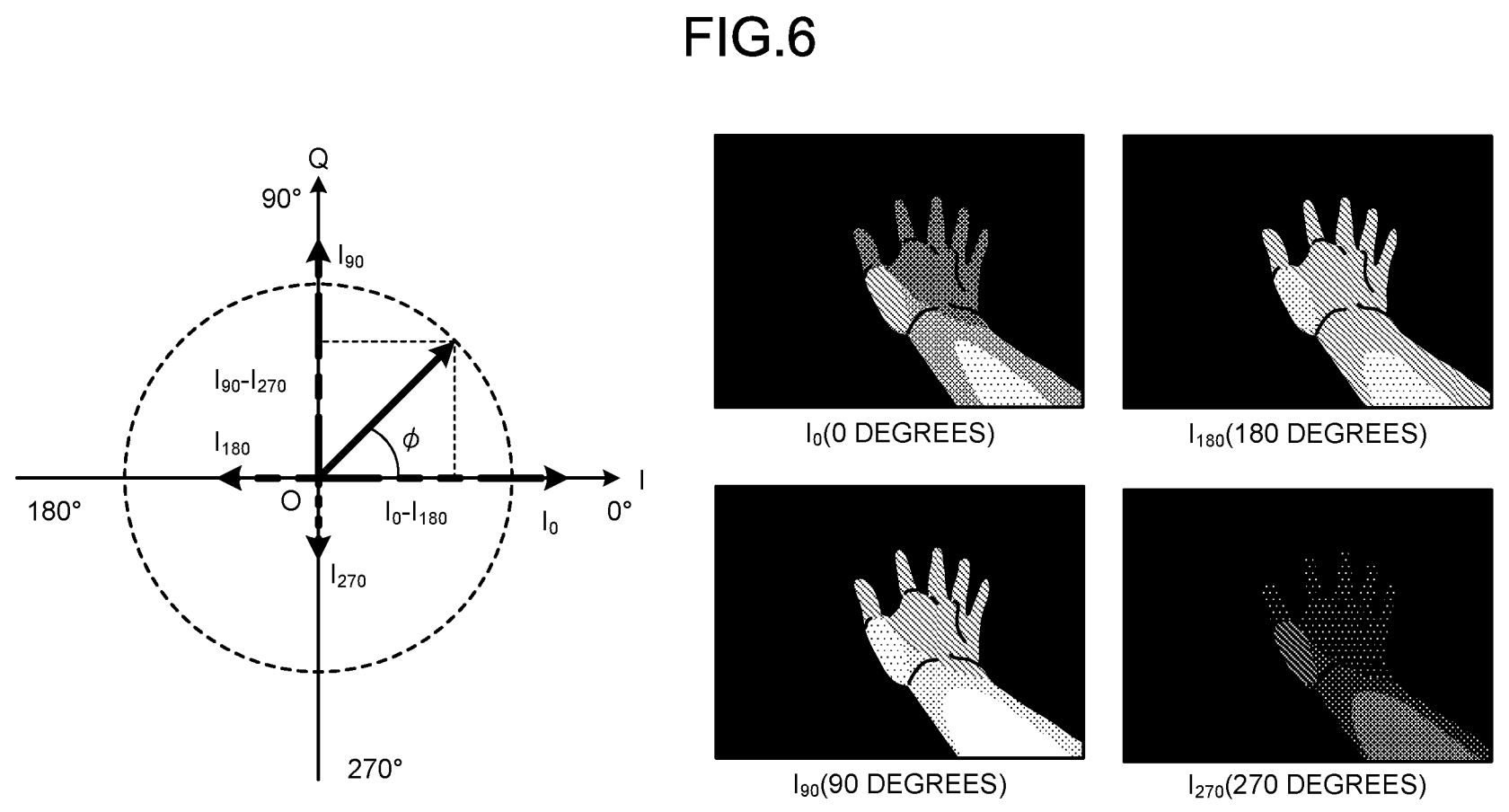

The image processing unit 172 performs image processing on the image acquired by the image acquisition unit 110. In a case where the sensor mode setting signal acquired from the determination unit 171 instructs the operation in the first sensor mode, the image processing unit 172 functions as a measurement unit that acquires the distance image based on the images (phase images) acquired by the image acquisition unit 110 in response to emission of infrared light from the light emitting unit 111 and measures a distance to a subject. FIG. 6 is an explanatory diagram for describing an example of a distance measurement method according to an embodiment of the present disclosure.

The example illustrated in FIG. 6 illustrates a method in which an emission intensity (IR emission intensity) of infrared light of the light emitting unit 111 is adjusted with a sinusoidal waveform of an angular frequency $\omega$, and a distance to a subject is measured by a phase difference $\phi$ between a waveform of emission of the infrared light and a waveform of light reflected from the subject and returned. The light emission waveform of the light emitting unit 111 can be expressed by the following Expression (1). Furthermore, the light reception waveform of the light receiving unit 112 can be expressed by the following Expression (2). In the following Expressions (1) and (2), a sign "A" represents an amplitude, and a sign "B" represents an offset.

$$M(t)=A_M \sin(\omega t)+B_M \quad (1)$$

$$L(t) = A_L\sin(\omega(t + t_d)) + B_L \quad (2)$$
$$= A_L\sin(\omega t + \omega t_d) + B_L$$
$$= A_L\sin(\omega t + \phi) + B_L$$

Here, since the phase difference $\phi=\omega t_d$ as in Expression (2) above, if the phase difference $\phi$ can be obtained in each pixel, the distance from each pixel to the subject can be calculated by the following Expression (3), in which a sign "c" represents a light speed.

$$c\cdot\phi/\omega\div2 \quad (3)$$

For example, in the example illustrated in FIG. 6, the phase difference $\phi$ is calculated from four images $I_0$, $I_{90}$, $I_{180}$, and $I_{270}$ acquired by the image acquisition unit 110 by receiving light with phases shifted by $\pi/2$. $\phi$ calculated from the four images $I_0$, $I_{90}$, $I_{180}$, and $I_{270}$ can be expressed by the following Expressions (4) to (7).

$$S_0(t) = I_0 = A'\cos(0 - \phi) + B' = A'\cos\phi + B' \quad (4)$$

$$S_1(t) = I_{90} = A'\cos\left(\frac{\pi}{2} - \phi\right) + B' = A'\sin\phi + B' \quad (5)$$

$$S_2(t) = I_{180} = A'\cos(\pi - \phi) + B' = -A'\cos\phi + B' \quad (6)$$

$$S_3(t) = I_{270} = A'\cos\left(\frac{3\pi}{2} - \phi\right) + B' = -A'\sin\phi + B' \quad (7)$$

Based on Expressions (4) to (7) above, a relationship represented by the following Expression (8) is established between the image $I_0$ and the image $I_{180}$, and a relationship represented by the following Expression (9) is established between the image $I_{90}$ and the image $I_{270}$.

$$I_0-I_{180}=2A' \cos \phi \quad (8)$$

$$I_{90}-I_{270}=2A' \sin \phi \quad (9)$$

In addition, the following Expression (10) is obtained from Expressions (8) and (9) above.

$$\frac{I_{90} - I_{270}}{I_0 - I_{180}} = \frac{2A'\sin\phi}{2A'\cos\phi} = \tan\phi = \frac{\sin\phi}{\cos\phi} \quad (10)$$

By transforming Expression (10) above, the phase difference $\phi$ necessary for obtaining the distance from each pixel to the subject is obtained by the following Expression (11).

$$\phi = \arctan\left(\frac{I_{90} - I_{270}}{I_0 - I_{180}}\right) \quad (11)$$

As described above, the image processing unit 172 causes the light emitting unit 111 to emit light to perform exposure while changing the phase, and acquires four phase images (images $I_0$, $I_{90}$, $I_{180}$, and $I_{270}$) as illustrated in FIG. 6. The image processing unit 172 calculates an I signal represented by Expression (8) above and a Q signal represented by Expression (9) above. Then, the image processing unit 172 obtains the phase difference $\phi$ by Expression (11) above to acquire the distance image.

Figure 7:
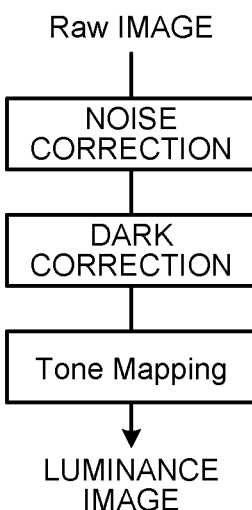
FIG. 7 is a diagram illustrating an example of a procedure of acquiring a luminance image according to an embodiment of the present disclosure.

Furthermore, in a case where the sensor mode setting signal acquired from the determination unit 171 instructs the operation in the second sensor mode, the light receiving unit 112 receives external light without infrared light emitted from the light emitting unit 111, whereby the image processing unit 172 acquires the luminance image from the image (raw image) acquired by the image acquisition unit 110. FIG. 7 is a diagram illustrating an example of a procedure of acquiring the luminance image according to an embodiment of the present disclosure.

As illustrated in FIG. 7, the image processing unit 172 acquires the luminance image by sequentially performing noise correction, dark correction, and tone mapping for the raw image acquired by the image acquisition unit 110.

FIG. 8 is a diagram illustrating a list of function examples related to the first sensor mode and the second sensor mode according to an embodiment of the present disclosure. In the example illustrated in FIG. 8, the number of times of exposure when the image acquisition unit 110 acquires the image is set to "four times" in the first sensor mode, and is set to "one time" in the second sensor mode. Furthermore, in the example illustrated in FIG. 8, an exposure time when the image acquisition unit 110 acquires the image is set to a time associated to each sensor mode.

Furthermore, as illustrated in FIG. 8, in the first sensor mode, the noise correction and distance calculation are set as functions necessary for the image processing unit 172 to acquire the distance image. Furthermore, in the second sensor mode, the noise correction, dark correction, and tone mapping are set as functions necessary for the image processing unit 172 to acquire the luminance image. Setting for the noise correction is made for each sensor mode.

As illustrated in FIG. 8, as setting associated to the second sensor mode is added to the image acquisition unit 110 and the image processing unit 172, the luminance image can be acquired using the TOF camera. The function addition can be implemented by changing firmware or changing a circuit configuration.

The recognition processing unit 173 performs subject recognition processing based on the image acquired by the image acquisition unit 110. In a case where the sensor mode setting signal acquired from the determination unit 171 instructs the operation in the first sensor mode, the recognition processing unit 173 performs the subject recognition processing based on the distance image acquired by the image processing unit 172. The result of the recognition processing based on the distance image is used for processing of an application program that requires a relatively highly accurate subject recognition result. Furthermore, in a case where the sensor mode setting signal acquired from the determination unit 171 instructs the operation in the second sensor mode, the recognition processing unit 173 performs the subject recognition processing based on the luminance image acquired by the image processing unit 172. The result of the recognition processing based on the luminance image is used for processing of an application program that does not require a highly accurate subject recognition result.

The application execution unit 174 performs the processing of the application program stored in the storage unit 160 based on the subject recognition result obtained by the recognition processing unit 173. The processing performed by the application execution unit 174 includes, for example, a 3D object operation performed in an augmented reality (AR) environment or a virtual reality (VR) environment.

3. PROCESSING PROCEDURE EXAMPLE

Figure 9:
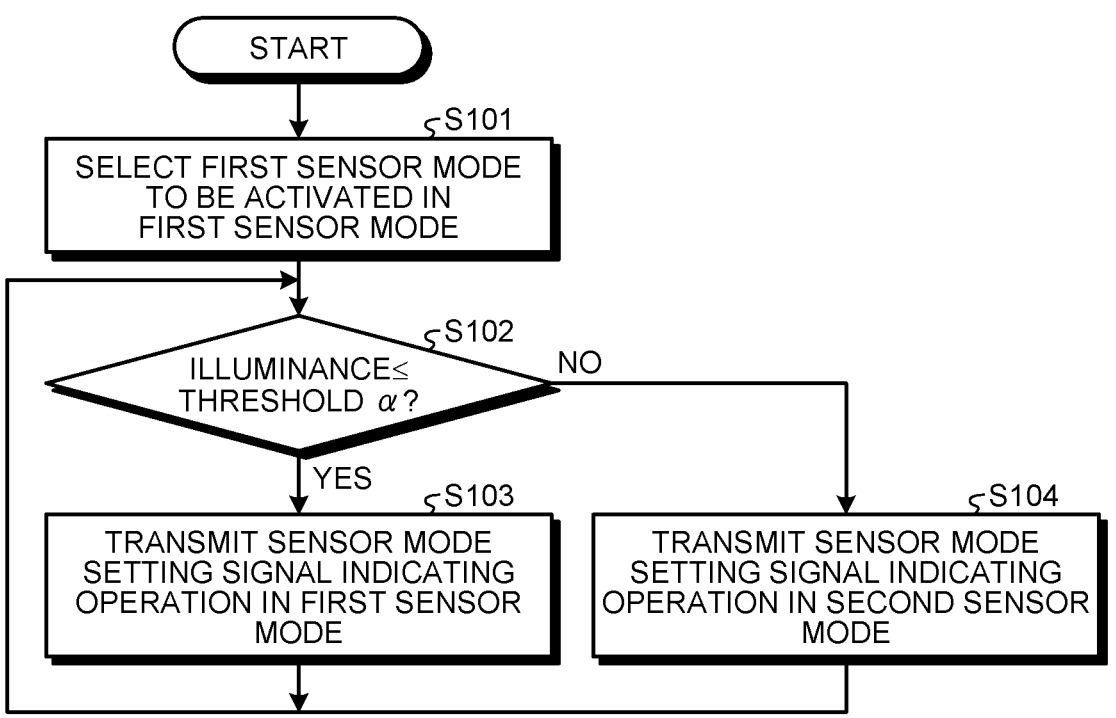
FIG. 9 is a flowchart illustrating an example of a processing procedure of the information processing device according to an embodiment of the present disclosure.

Hereinafter, a processing procedure example of the information processing device 100 according to an embodiment of the present disclosure will be described with reference to FIG. 9. FIG. 9 is a flowchart illustrating an example of a processing procedure of the information processing device according to an embodiment of the present disclosure. The processing procedure illustrated in FIG. 9 is performed by the control unit 170 included in the information processing device 100. The processing procedure illustrated in FIG. 9 is repeatedly performed during the operation of the information processing device 100.

As illustrated in FIG. 9, after the information processing device 100 selects the first sensor mode to be activated in the first sensor mode (Step S101), the determination unit 171 determines whether or not the illuminance acquired by the illuminance acquisition unit 150 is less than a predetermined threshold α (Step S102).

In a case where the determination unit 171 determines that the illuminance is less than the threshold α (Step S102; Yes), the sensor mode setting signal indicating the operation in the first sensor mode is transmitted to the image acquisition unit 110, the image processing unit 172, and the recognition processing unit 173 (Step S103). Then, the determination unit 171 returns to the processing procedure of Step S102 described above.

On the other hand, in a case where the determination unit 171 determines that the illuminance is equal to or higher than the threshold α (Step S102; No), the sensor mode setting signal indicating the operation in the second sensor mode is transmitted to the image acquisition unit 110, the image processing unit 172, and the recognition processing unit 173 (Step S104). Then, the determination unit 171 returns to the processing procedure of Step S102 described above.

In the processing procedure illustrated in FIG. 9, an example in which the information processing device 100 is activated in the first sensor mode has been described, but the information processing device 100 may also be activated in the second sensor mode. Furthermore, the information processing device 100 may keep a state in which mode determination is not made until the determination result of the determination unit 171 is obtained. In this case, the information processing device 100 may perform control in such a way as not to acquire an image until the sensor mode is determined.

4. MODIFIED EXAMPLES

Hereinafter, a modified example of the information processing device 100 according to the above-described embodiment will be described.

<4-1. Determination of Operation Mode Based on Luminance Value of Image>

In the above-described embodiment, an example in which the determination unit 171 determines whether to operate in the first sensor mode or the second sensor mode based on the illuminance has been described. However, the present disclosure is not particularly limited thereto. For example, the determination unit 171 may perform the mode determination based on an image analysis result, that is, a luminance value of a pixel included in the distance image or the luminance image. FIG. 10 is a diagram illustrating an outline of the operation of the determination unit according to the modified example.

As illustrated in FIG. 10, the determination unit 171 acquires the distance image or the luminance image from the image processing unit 172. Then, the determination unit 171 determines in which one of the first sensor mode and the second sensor mode the operation is to be made based on the luminance value of the pixel included in the distance image or the luminance image.

For example, in a case where the number of pixels whose luminance values exceed a predetermined threshold β among the pixels included in the distance image is less than a predetermined number, the determination unit 171 determines that there is a low possibility that the image acquired by the image processing unit 172 has caused flared highlights, and there is a high possibility that the distance information can be acquired. Then, the sensor mode setting signal indicating the operation in the first sensor mode is transmitted to the image acquisition unit 110, the image processing unit 172, and the recognition processing unit 173.

On the other hand, for example, in a case where the number of pixels whose luminance values exceed the predetermined threshold β is equal to or larger than the predetermined number among the pixels included in the distance image, the determination unit 171 determines that there is a high possibility that the image acquired by the image processing unit 172 has caused flared highlights and there is a low possibility that the distance information can be acquired. Then, the determination unit 171 transmits the sensor mode setting signal indicating the operation in the second sensor mode to the image acquisition unit 110, the image processing unit 172, and the recognition processing unit 173.

<4-2. Determination Based on Remaining Power Amount and Use Purpose of Recognition Result>

In <4-1.> described above, the determination unit 171 may perform the mode determination further in consideration of the remaining power amount of the information processing device 100 and the use purpose of the subject recognition result of the application program. FIG. 11 is a diagram illustrating an outline of the operation of the determination unit according to the modified example.

As illustrated in FIG. 11, the information processing device 100 further includes a battery remaining amount measurement unit 175. The battery remaining amount measurement unit 175 measures the remaining amount of power that can be supplied by a battery included in the information processing device 100, and transmits the measured remaining power amount to the determination unit 171. In addition, the application execution unit 174 transmits use purpose information indicating the use purpose of the subject recognition result obtained by the determination unit 171. For example, in a case where the subject is a user's hand, the use purpose information is information for specifying the purpose of using the result of recognizing the user's hand. Examples of the use purpose information include a computer game or a computer aided design in which a level design requiring relatively high-accuracy recognition is an open world, operation of a three-dimensional object, and recognition of a paper, rock, scissors gesture or hand gesture that does not require high accuracy.

In addition to the luminance value of the pixel included in the distance image or the luminance image, the determination unit 171 determines in which one of the first sensor mode and the second sensor mode the operation is to be made based on the remaining power amount acquired from the battery remaining amount measurement unit 175 and the use purpose information acquired from the application execution unit 174. For example, the determination unit 171 determines to operate in the first sensor mode on the condition that there is a high possibility that the distance information can be acquired from the distance image acquired by the image processing unit 172 in a case where highly accurate subject recognition from the use purpose information is required and the remaining battery level is a certain level or more. On the other hand, in a case where highly accurate subject recognition from the use purpose information is not required or in a case where the remaining battery level is less than a certain level, the determination unit 171 determines to operate in the second sensor mode on the condition that the luminance image acquired by the image processing unit 172 does not cause blocked-up shadows.

Figure 12:
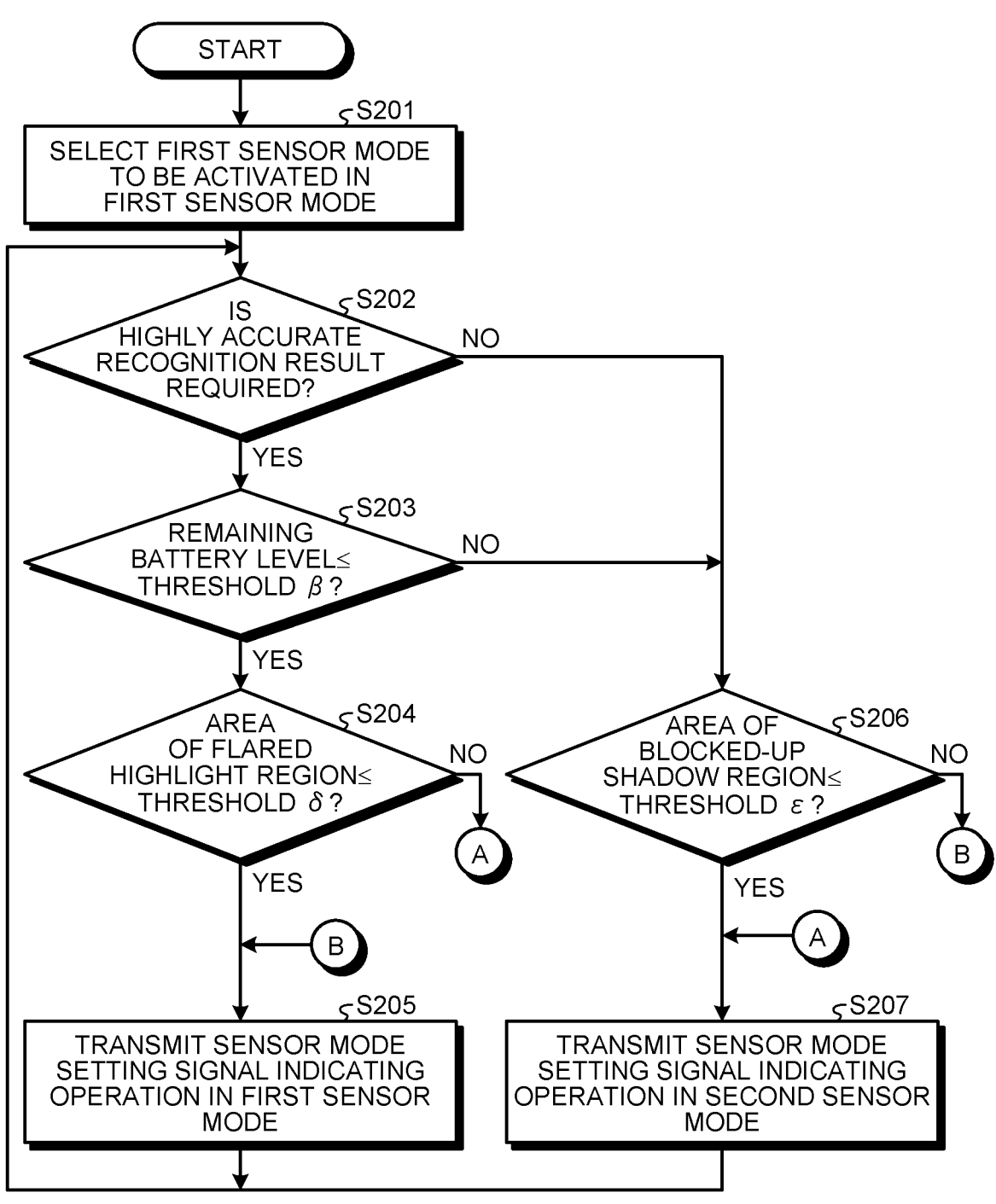
FIG. 12 is a flowchart illustrating an example of a processing procedure of the information processing device according to the modified example.

Hereinafter, a processing procedure example of the information processing device 100 according to the modified example will be described with reference to FIG. 12. FIG. 12 is a flowchart illustrating an example of a processing procedure of the information processing device according to the modified example.

As illustrated in FIG. 12, after the information processing device 100 is activated in the first sensor mode (Step S201), the determination unit 171 determines whether a highly accurate subject recognition result is required based on the use purpose information acquired from the application execution unit 174 (Step S202).

In a case where it is determined that a highly accurate subject recognition result is required (Step S202; Yes), the determination unit 171 determines, based on the remaining power amount acquired from the battery remaining amount measurement unit 175, whether or not the remaining power amount is equal to or more than the threshold β (Step S203).

In a case where it is determined that the remaining power amount is equal to or more than the threshold β (Step S203; Yes), the determination unit 171 determines whether or not the area of a flared highlight region in the distance image acquired from the image processing unit 172 is less than a threshold δ (Step S204).

In a case where it is determined that the area of the flared highlight region is less than the threshold δ (Step S204; Yes), the determination unit 171 transmits the sensor mode setting signal indicating the operation in the first sensor mode to the image acquisition unit 110, the image processing unit 172, and the recognition processing unit 173 (Step S205). Then, the determination unit 171 returns to the processing procedure of Step S202 described above.

In Step S202 described above, in a case where it is determined that a highly accurate subject recognition result is not required (Step S202; No), the determination unit 171 determines whether or not the area of a blocked-up shadow region in the luminance image acquired from the image processing unit 172 is less than a threshold ε (Step S206).

In a case where it is determined that the area of the blocked-up shadow region is less than the threshold ε (Step S206; Yes), the determination unit 171 transmits the sensor mode setting signal indicating the operation in the second sensor mode to the image acquisition unit 110, the image processing unit 172, and the recognition processing unit 173 (Step S207). Then, the determination unit 171 returns to the processing procedure of Step S202 described above.

In Step S203 described above, in a case where it is determined that the remaining power amount is less than the threshold β (Step S203; No), the determination unit 171 proceeds to the processing procedure of Step S206 described above. That is, even in a case where it is determined that a highly accurate subject recognition result is required, the information processing device 100 does not perform the recognition processing based on the distance image if the remaining power amount is not equal to or more than a certain amount.

In Step S204 described above, in a case where it is determined that the area of the blocked-up shadow region is equal to or more than the threshold δ (Step S204; No), the determination unit 171 proceeds to the processing procedure of Step S207 described above. That is, the information processing device 100 does not perform the recognition processing based on the distance image in a case where there is a high possibility that the distance image cannot be acquired even when a highly accurate subject recognition result is required and the remaining power amount is equal to or more than a certain amount.

In Step S206 described above, in a case where it is determined that the area of the blocked-up shadow region is equal to or more than the threshold ε (Step S206; No), the determination unit 171 proceeds to the processing procedure of Step S205 described above. That is, the information processing device 100 does not perform the recognition processing based on the luminance image in a case where there is a high possibility that the luminance image cannot be acquired even when a highly accurate subject recognition result is not required and the remaining power amount is less than a certain amount.

In performing the processing procedure of Step S204 described above, the determination unit 171 can instruct the image acquisition unit 110 and the image processing unit 172 to acquire the distance image, thereby acquiring the distance image for determination in Step S204 even before transmitting the sensor setting signal. In addition, the determination unit 171 can instruct the image acquisition unit 110 and the image processing unit 172 to acquire the luminance image, thereby acquiring the luminance image for determination in Step S206 even before transmitting the sensor setting signal when performing the processing procedure in Step S206 described above.

Further, in the processing procedure illustrated in FIG. 12, an example in which the information processing device 100 is activated in the first sensor mode has been described, but the information processing device 100 may also be activated in the second sensor mode. Furthermore, the information processing device 100 may keep a state in which mode determination is not made until the determination result of the determination unit 171 is obtained.

<4-3. Hybrid Use Example (1)>

In the above-described embodiment, an example in which the recognition processing is performed based on the image acquired in the first sensor mode or the second sensor mode has been described. However, the luminance image acquired in the first sensor mode does not include the distance information to the subject. Therefore, there are two points of uncertainty described below, and the three-dimensional subject recognition performance is low. Hereinafter, uncertainty in a case where the subject is a user's hand will be exemplified.

[Example 1 of Uncertainty]: Since the size of the hand is unknown, it is not possible to distinguish whether a large hand is in a distant position or a small hand is in a close position.

[Example 2 of Uncertainty]: Since the balance of the shape of the hand is not known, it is not possible to distinguish whether a long finger is folded or a small finger is lifted with respect to the screen.

Figure 13:
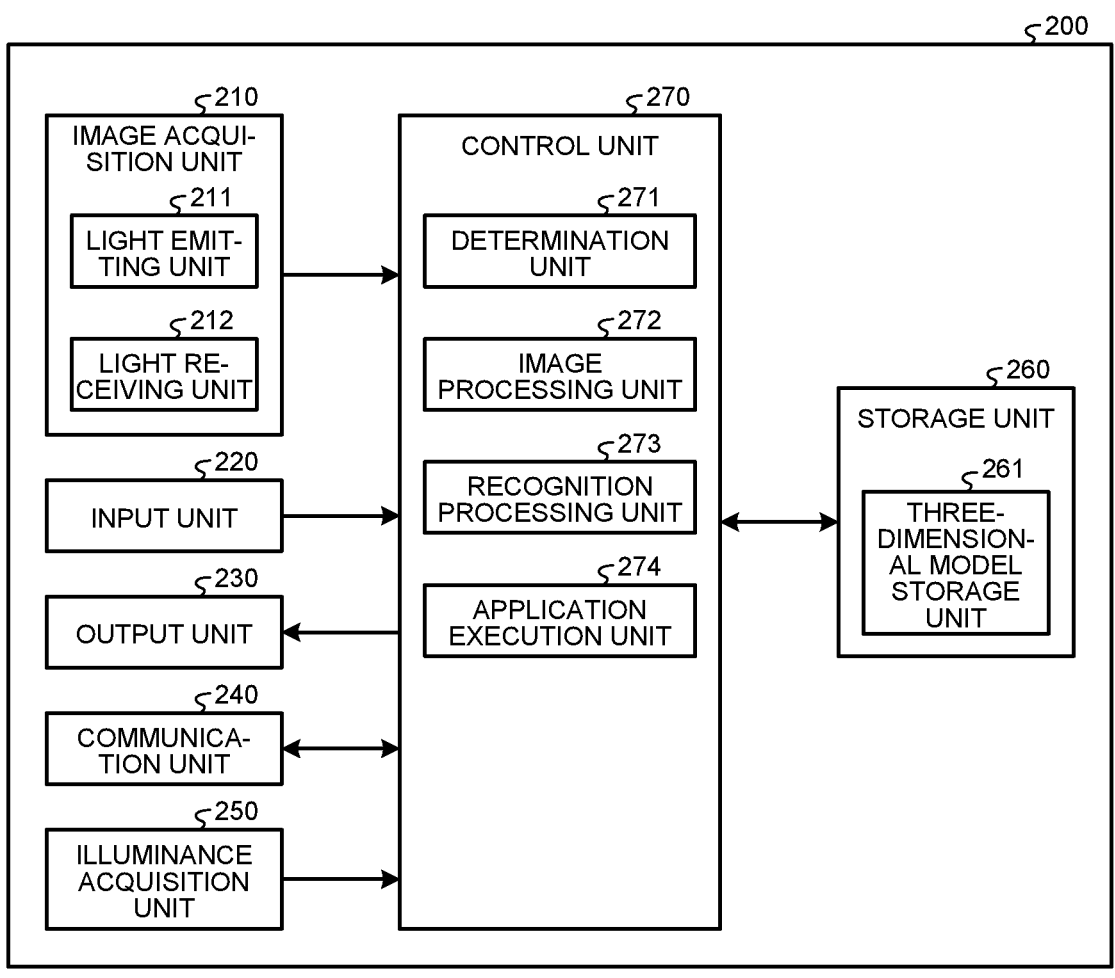
FIG. 13 is a block diagram illustrating an example of a functional configuration of an information processing device according to Hybrid Use Example (1).

The uncertainty in the recognition of the hand based on the luminance image can be eliminated by using, for example, a processing result based on the distance image. Consequently, the subject recognition performance can be improved even when using the luminance image of the subject acquired in the first sensor mode. Hereinafter, Hybrid Use Example (1) in which a processing result based on the distance image acquired in the first sensor mode is used for the recognition processing based on the luminance image acquired in the first sensor mode will be described. FIG. 13 is a block diagram illustrating an example of a functional configuration of an information processing device according to Hybrid Use Example (1).

As illustrated in FIG. 13, an information processing device 200 includes an image acquisition unit 210, an input unit 220, an output unit 230, a communication unit 240, an illuminance acquisition unit 250, a storage unit 260, and a control unit 270. The image acquisition unit 210 corresponds to the image acquisition unit 110 illustrated in FIG. 4, the input unit 220 corresponds to the input unit 120 illustrated in FIG. 4, the output unit 230 corresponds to the output unit 130 illustrated in FIG. 4, and the communication unit 240 corresponds to the communication unit 140 illustrated in FIG. 4. Furthermore, the storage unit 260 corresponds to the storage unit 160 illustrated in FIG. 4, and the control unit 270 corresponds to the control unit 170 illustrated in FIG. 4. The information processing device 200 illustrated in FIG. 13 basically has the same processing function as the information processing device 100 illustrated in FIG. 4, but differs from the information processing device 100 illustrated in FIG. 4 in the following points.

The storage unit 260 includes a three-dimensional model storage unit 261. The three-dimensional model storage unit 261 stores data of a three-dimensional model including a feature point position of the subject. In a case where the information processing device 200 is used by a plurality of users, the three-dimensional model storage unit 261 stores three-dimensional model data for each user. In a case where the subject is a user's hand, the three-dimensional model storage unit 261 stores data (which is hereinafter referred to as a "hand model") indicating a three-dimensional position of a feature point such as a fingertip or joint.

The control unit 270 includes a determination unit 271, an image processing unit 272, a recognition processing unit 273, and an application execution unit 274. The determination unit 271 corresponds to the determination unit 171 illustrated in FIG. 4 and has a processing function similar to that of the determination unit 171. In addition, the application execution unit 274 corresponds to the application execution unit 174 illustrated in FIG. 4, and has a processing function similar to that of the application execution unit 174.

The image processing unit 272 has a processing function similar to that of the image processing unit 172 illustrated in FIG. 4. In addition, the image processing unit 272 generates the hand model based on the distance image acquired in the first sensor mode. The image processing unit 272 stores date of the generated hand model in the storage unit 260 in association with the user.

Figure 14:
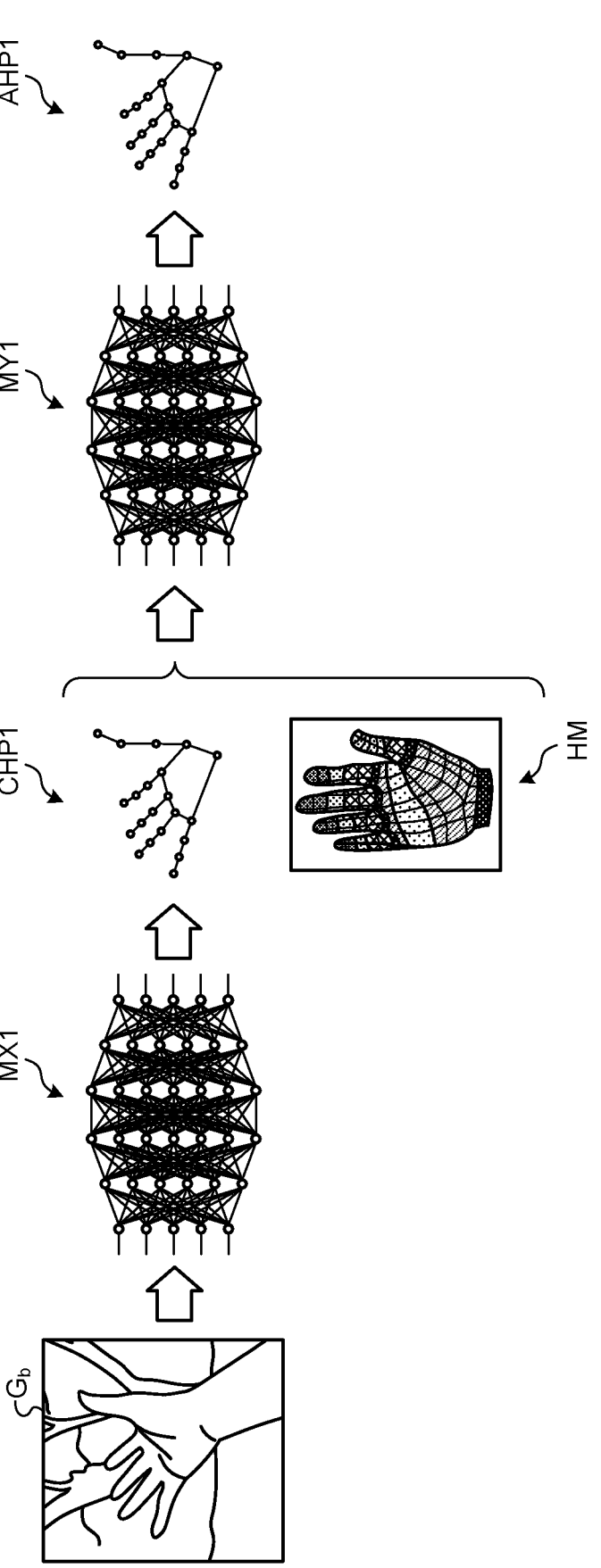
FIG. 14 is a diagram illustrating an outline of Hybrid Use Example (1).

The recognition processing unit 273 acquires an absolute feature point position of the subject based on a relative feature point position of the subject estimated based on the luminance image acquired by the image processing unit 272 and the three-dimensional model of the subject generated in advance based on the result of the measurement processing performed by the measurement unit. The luminance image is an example of the second image. FIG. 14 is a diagram illustrating an outline of Hybrid Use Example (1). Hybrid Use Example (1) in a case where the subject is a hand of a user of the information processing device 200 will be described with reference to FIG. 14.

As illustrated in FIG. 14, the recognition processing unit 273 inputs the luminance image $G_b$ acquired by the image processing unit 272 to a trained model MX1. The trained model MX1 is a trained model that has been subjected to machine-learning in such a way that the luminance image $G_b$ obtained by imaging the user's hand that is the subject is input, and a relative positional relationship of a feature point of the user's hand with respect to a position of the camera is correctly inferred. As a learning algorithm for generating the trained model MX1, a convolutional neural network (CNN) or the like can be used. The learning algorithm is not particularly limited to the CNN, and any learning algorithm may be used as long as a model that can correctly infer the relative positional relationship of the feature point of the subject can be generated. In a case of using the CNN, it is possible to generate the trained model MX1 by preparing a large number of pairs of the luminance images of the hand and the two-dimensional position coordinates of the feature points of the hand and performing general deep learning processing as a task of outputting the two-dimensional position coordinates of the hand from the luminance image.

The recognition processing unit 273 acquires an inference result CHP1 for the relative feature point position of the user's hand that is the subject from the output of the trained model MX1. The relative feature point position with respect to the position of the camera indicates a position of a two-dimensionally specified feature point, and means that a distance between the image acquisition unit 210 and the feature point of the subject (user's hand) is indefinite. Subsequently, the recognition processing unit 273 acquires a hand model HM associated with a user who is using the information processing device 200 from the three-dimensional model storage unit 261.

The recognition processing unit 273 inputs the inference result CHP1 for the relative feature point position of the user's hand acquired from the trained model MX1 and the hand model HM corresponding to the user's hand that is the subject to a trained model MY1. The trained model MY1 is a trained model that is subjected to machine-learning in such a way that the inference result CHP1 for the relative feature point position of the user's hand and the corresponding hand model HM are input and an absolute positional relationship of the feature point of the user's hand with respect to the position of the camera is correctly inferred. As a learning algorithm for generating the trained model MY1, a convolutional neural network (CNN) or the like can be used. The learning algorithm is not particularly limited to the CNN, and any learning algorithm may be used as long as a model that can correctly infer the absolute positional relationship of the feature point of the subject can be generated. As described above, the recognition processing unit 273 can improve accuracy in recognizing the subject included in the luminance image by using the three-dimensional model corresponding to the subject at the time of recognizing the subject included in the luminance image acquired in the first sensor mode. In a case of using the CNN, it is possible to generate the trained model MY1 by folding the joint of the hand model HM at an arbitrary angle to generate a large amount of three-dimensional coordinates of the feature points of the hand, and performing general deep learning processing as a task of outputting the three-dimensional coordinates of the feature points of the hand using the two-dimensional coordinates obtained by removing depth information and the hand model HM as inputs.

The recognition processing unit 273 acquires an absolute feature point position AHP1 of the user's hand that is the subject from the output of the trained model MY1. The absolute feature point position with respect to the position of the camera indicates a position of a three-dimensionally specified feature point, and means that a distance between the image acquisition unit 210 and the feature point of the subject (user's hand) is definite. Then, the recognition processing unit 273 transmits the absolute feature point position AHP1 of the user's hand that is the subject to the application execution unit 274. The application execution unit 274 performs processing of the application program based on the feature point position AHP1 of the user's hand.

Hybrid Use Example (1) described above can be similarly applied to the <<4. Modified Examples>> described above.

<4-4. Hybrid Use Example (2)>

Figure 15:
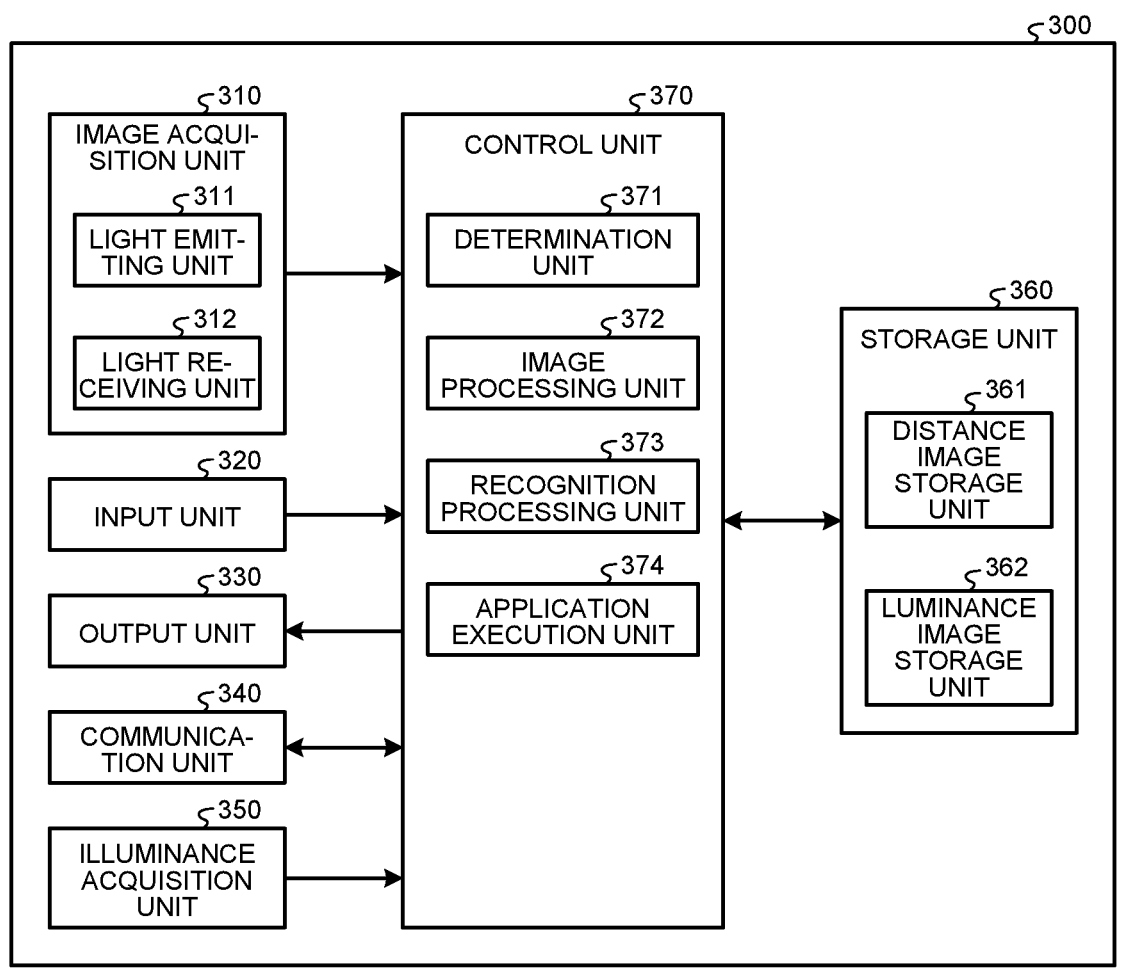
FIG. 15 is a block diagram illustrating an example of a functional configuration of an information processing device according to Hybrid Use Example (2).

Hereinafter, Hybrid Use Example (2) in which the distance image (an example of the first image) acquired in the first sensor mode and the luminance image (an example of the second image) acquired in the second sensor mode are used at the time of recognizing the subject will be described. FIG. 15 is a block diagram illustrating an example of a functional configuration of an information processing device according to Hybrid Use Example (2).

As illustrated in FIG. 15, an information processing device 300 includes an image acquisition unit 310, an input unit 320, an output unit 330, a communication unit 340, an illuminance acquisition unit 350, a storage unit 360, and a control unit 370. The image acquisition unit 310 corresponds to the image acquisition unit 110 illustrated in FIG. 4, the input unit 320 corresponds to the input unit 120 illustrated in FIG. 4, the output unit 330 corresponds to the output unit 130 illustrated in FIG. 4, and the communication unit 340 corresponds to the communication unit 140 illustrated in FIG. 4. Furthermore, the storage unit 360 corresponds to the storage unit 160 illustrated in FIG. 4, and the control unit

370 corresponds to the control unit 170 illustrated in FIG. 4. The information processing device 300 illustrated in FIG. 15 basically has the same processing function as the information processing device 100 illustrated in FIG. 4, but differs from the information processing device 100 illustrated in FIG. 4 in the following points.

The storage unit 360 includes a distance image storage unit 361 and a luminance image storage unit 362. The distance image storage unit 361 stores the distance image acquired by an image processing unit 272 in the first sensor mode in association with a time stamp. The luminance image storage unit 362 stores the luminance image acquired by the image processing unit 272 in the second sensor mode in association with a time stamp.

The control unit 370 includes a determination unit 371, an image processing unit 372, a recognition processing unit 373, and an application execution unit 374. The determination unit 371 corresponds to the determination unit 171 illustrated in FIG. 4 and has a processing function similar to that of the determination unit 171. The image processing unit 372 corresponds to the image processing unit 172 illustrated in FIG. 4 and has a processing function similar to that of the image processing unit 172. In addition, the application execution unit 374 corresponds to the application execution unit 174 illustrated in FIG. 4, and has a processing function similar to that of the application execution unit 174.

Figure 16:
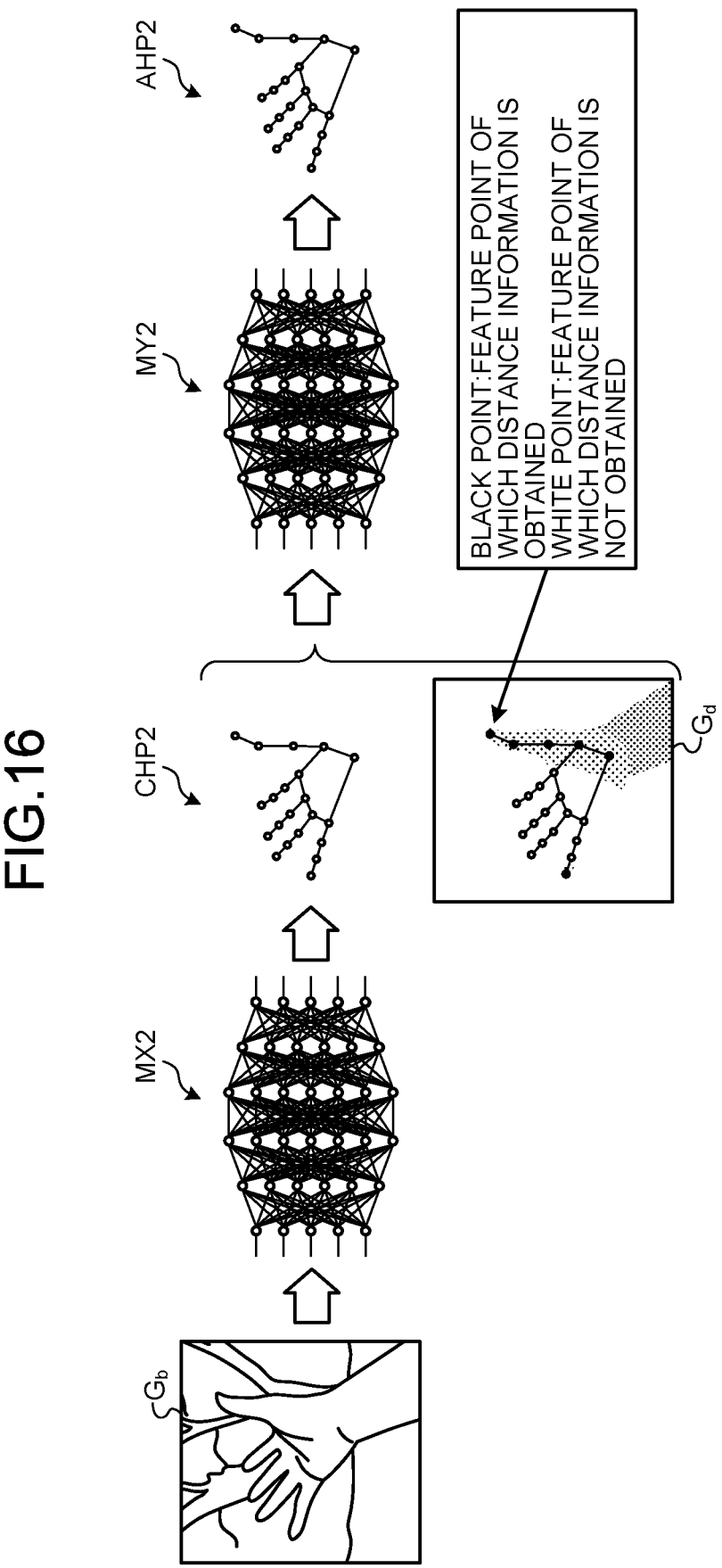
FIG. 16 is a diagram illustrating an outline of Hybrid Use Example (2).

The recognition processing unit 373 acquires an absolute feature point position of the subject based on a relative feature point position of the subject estimated based on the luminance image acquired by the image processing unit 372 and the distance image acquired by the image processing unit 372. FIG. 16 is a diagram illustrating an outline of Hybrid Use Example (2). Hybrid Use Example (2) in a case where the subject is a hand of a user of the information processing device 200 will be described with reference to FIG. 16.

As illustrated in FIG. 16, the recognition processing unit 373 inputs the luminance image $G_b$ acquired by the image processing unit 372 to a trained model MX2. The trained model MX2 is a trained model that has been subjected to machine-learning in such a way that the luminance image $G_b$ obtained by imaging the user's hand that is the subject is input and a relative positional relationship of a feature point of the user's hand with respect to the camera, and corresponds to the trained model MX1 illustrated in FIG. 14.

Subsequently, the recognition processing unit 373 acquires an inference result CHP2 for the relative feature point position of the user's hand that is the subject from the output of the trained model MX2. Subsequently, the recognition processing unit 373 acquires the distance image $G_d$ acquired at a time closest to a time at which the luminance image $G_b$ input to the trained model MX2 is acquired from the distance images stored in the distance image storage unit 361. For example, the recognition processing unit 373 acquires the distance image $G_d$ acquired at a time temporally closest to the time at which the luminance image $G_b$ is acquired, based on the time stamp associated with the luminance image Gb and the time stamp associated with distance image Gd. Then, the recognition processing unit 373 acquires distance information (for example, distance information of a point indicated by a black circle in FIG. 16) of the feature point of the user's hand normally acquired without failure from the acquired distance image $G_d$.

The recognition processing unit 373 inputs an inference result CHP2 for the relative feature point position of the user's hand that is the subject and the distance information of the feature point of the user's hand acquired from the distance image $G_d$ to a trained model MY2. The trained model MY2 is a trained model that is subjected to machine-learning in such a way that the inference result CHP2 for the relative feature point position of the subject (user's hand) inferred from the luminance image $G_b$ and the distance information of the feature point of (user's hand) acquired from the corresponding distance information are input, and an absolute feature point position of the subject (user's hand) with respect to the camera is correctly inferred. As a learning algorithm for generating the trained model MY2, a convolutional neural network (CNN) or the like can be used. The learning algorithm is not particularly limited to the CNN, and any learning algorithm may be used as long as a model that can correctly infer the absolute positional relationship of the feature point of the subject can be generated. As described above, the recognition processing unit 373 can estimate distance information missing in the distance image and acquire the absolute feature point position by using the feature point position obtained from the luminance image and the distance information obtained from the corresponding distance image in a mutually complementary manner at the time of recognizing the subject. As a result, the recognition performance of the recognition processing based on the luminance image can be improved.

The recognition processing unit 373 acquires an absolute feature point position AHP2 of the user's hand that is the subject from the output of the trained model MY2. Then, the recognition processing unit 373 transmits the absolute feature point position AHP2 of the user's hand that is the subject to the application execution unit 374. The application execution unit 374 performs processing of the application program based on the feature point position AHP2 of the user's hand.

Hybrid Use Example (2) described above can be similarly applied to the <<4. Modified Examples>> described above.

5. OTHERS

The information processing devices 100, 200, and 300 according to the embodiments and the modified examples of the present disclosure may be implemented by a dedicated computer system or a general-purpose computer system.

In addition, various programs for implementing an information processing method executed by the information processing devices 100, 200, and 300 according to the embodiments and the modified examples of the present disclosure may be stored and distributed in a computer-readable recording medium such as an optical disk, a semiconductor memory, a magnetic tape, or a flexible disk. At this time, for example, AR glasses 30 implement the information processing method according to the embodiments and the modified examples of the present disclosure by installing and executing various programs in a computer.

In addition, various programs for implementing the information processing method executed by the information processing devices 100, 200, and 300 according to the embodiments and the modified examples of the present disclosure may be stored in a disk device included in a server device on a network such as the Internet and may be downloaded to a computer. Furthermore, functions provided by various programs for implementing the information processing method executed by the information processing devices 100, 200, and 300 according to the embodiments and the modified examples of the present disclosure may be implemented by cooperation of an OS and an application program. In this case, the part other than the OS may be stored in a medium and distributed, or the part other than the OS may be stored in a server device and downloaded to a computer.

Further, among the respective processing described in the above-described embodiments and the modified examples of the present disclosure, all or some of the processing described as being automatically performed can be manually performed. Alternatively, all or some of the processing described as being manually performed can be automatically performed by a known method. In addition, the processing procedures, specific names, information including various data and parameters illustrated in the specification and drawings can be arbitrarily changed unless otherwise specified. For example, various pieces of information illustrated in the drawings are not limited to those illustrated in the drawings.

Furthermore, each component (see FIGS. 4, 13, and 15) of the information processing devices 100, 200, and 300 according to the embodiments and the modified examples of the present disclosure is functionally conceptual, and does not necessarily need to be physically configured as illustrated in the drawings. That is, the specific modes of distribution/integration of the respective devices are not limited to those illustrated in the drawings. All or some of the devices can be functionally or physically distributed/integrated in any arbitrary unit, depending on various loads or the usage status.

Further, the embodiments of the present disclosure can be appropriately combined as long as the processing contents do not contradict each other. Further, the order of each step illustrated in the flowchart according to an embodiment of the present disclosure can be changed as appropriate.

6. HARDWARE CONFIGURATION

Figure 17:
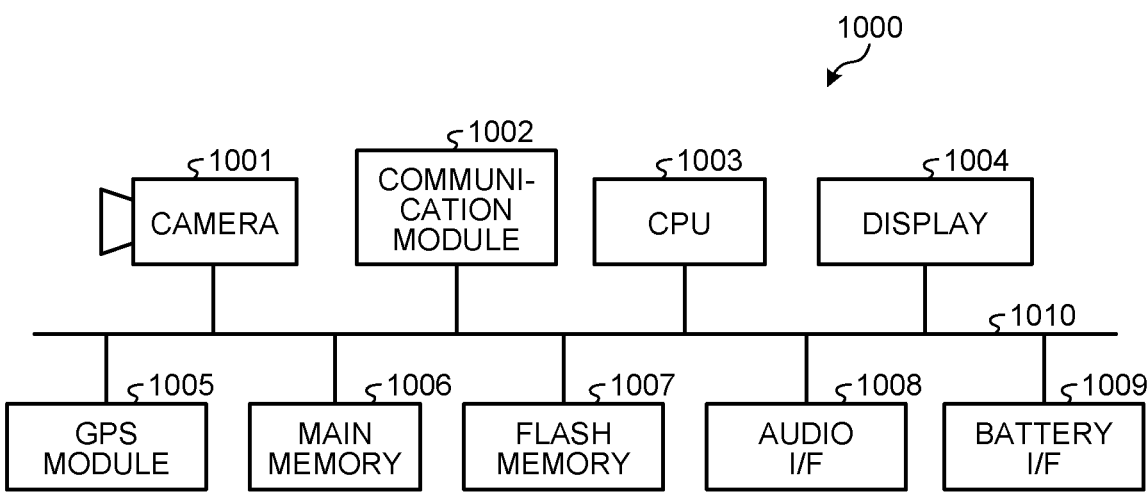
FIG. 17 is a block diagram illustrating a hardware configuration example of a computer capable of implementing the information processing device according to the present disclosure.

A hardware configuration example of a computer capable of implementing the information processing devices 100, 200, and 300 according to the embodiments and the modified examples of the present disclosure will be described with reference to FIG. 17. FIG. 17 is a block diagram illustrating a hardware configuration example of a computer capable of implementing the information processing device according to the present disclosure. Examples of a computer 1000 illustrated in FIG. 17 include a smartphone, a tablet PC, and a head mounted display. FIG. 17 illustrates an example of the computer, and is not necessarily limited to the configuration illustrated in FIG. 17.

As illustrated in FIG. 17, the computer 1000 includes a camera 1001, a communication module 1002, a CPU 1003, a display 1004, a global posting system (GPS) module 1005, a main memory 1006, a flash memory 1007, an audio interface (I/F) 1008, and a battery interface (I/F) 1009. The units included in the computer 1000 are mutually connected by a bus 1010.

The camera 1001 is an imaging device, for example, a TOF camera. The functions of the image acquisition units 110, 210, and 310 described above can be implemented by the camera 1001.

The communication module 1002 is a communication device. For example, the communication module 1002 is a communication card for wired or wireless local area network (LAN), long term evolution (LTE), Bluetooth (registered trademark), wireless USB (WUSB), or the like. Furthermore, a communication device 3100 may be a router for optical communication, various communication modems, or the like. The functions of the communication unit 140, the communication unit 240, and the communication unit 240 in the above-described embodiments and the like are implemented by the communication module 1002.

The CPU 1003 functions as, for example, an arithmetic processing device or a control device, and controls the overall operation of each component or a part thereof based on various programs recorded in the flash memory 1007. The various programs stored in the flash memory 1007 include programs that provide various functions for implementing information processing performed by the information processing devices 100, 200, and 300 in the above-described embodiments and the like. The computer 1000 may implement a system-on-a-chip (SoC) instead of the CPU 1003.

The display 1004 is a display device, and is implemented by a liquid crystal display (LCD), an organic electro-luminescence (EL) display, or the like. The display 1004 may be implemented by a touch screen display including a touch screen.

The GPS module 1005 is a receiver that receives a GPS signal transmitted from a GPS satellite. The GPS module 1005 transmits the received GPS signal to the CPU 1003 and supports processing of calculating the current position of the computer 1000 by the GPS module 1005.

The main memory 1006 is a main storage device implemented by a RAM or the like, and temporarily or permanently stores, for example, a program read by the CPU 1003, various parameters that appropriately change when the program read by the CPU 3010 is executed, and the like. The flash memory 1007 is an auxiliary storage device, and stores a program read by the CPU 1003, data used for calculation, and the like. The functions of the storage units 160, 260, and 360 in the above-described embodiments and the like are implemented by the main memory 1006 and the flash memory 1007.

The audio interface (I/F) 1008 connects a sound device such as a microphone or a speaker to the bus 1010. The battery interface (I/F) 1009 connects a battery to a power supply line to each unit of the computer 1000.

The CPU 1003, the main memory 1006, and the flash memory 1007 described above implement various functions of the units (the determination unit 171, the application execution unit 174, and the like) included in the control unit 170 of the information processing device 100 in the above-described embodiment in cooperation with software (various programs stored in the flash memory 1007 or the like). Similarly, the CPU 1003, the main memory 1006, and the flash memory 1007 described above implement various functions of the units (the determination unit 271, the application execution unit 274, and the like) included in the control unit 270 of the information processing device 200 in the above-described modified example in cooperation with software (various programs stored in the flash memory 1007 or the like). Similarly, the CPU 1003, the main memory 1006, and the flash memory 1007 described above implement various functions of the units (the determination unit 371, the application execution unit 374, and the like) included in the control unit 370 of the information processing device 300 in the modified example described above in cooperation with software (various programs stored in the flash memory 1007 or the like). The CPU 1003 executes various programs for implementing information processing of the information processing devices 100, 200, and 300, and performs calculation processing and the like using data acquired via the camera 1001 or various interfaces to perform the information processing in the information processing devices 100, 200, and 300.

7. CONCLUSION

The information processing device according to an embodiment of the present disclosure includes the image acquisition unit, the measurement unit, and the recognition processing unit. The image acquisition unit acquires an image by receiving external light by the light receiving unit. The measurement unit measures a distance to a subject based on the first image acquired by the image acquisition unit in response to emission of infrared light from the light emitting unit. The recognition processing unit performs subject recognition processing based on the second image acquired by the image acquisition unit that has received external light without infrared light emitted from the light emitting unit.

Thus, the information processing device can obtain a sufficient recognition result under an environment strongly affected by external light, and can improve image processing using a TOF camera.

Furthermore, the information processing device further includes the determination unit that determines whether or not to perform measurement processing by the measurement unit. The measurement unit performs the measurement processing in a case where the determination unit determines to perform the measurement processing. That is, in a case where a sensor mode setting signal acquired from the determination unit instructs the operation in the first sensor mode, the image processing unit functioning as the measurement unit acquires the distance image based on images (phase images) acquired by the image acquisition unit in response to emission of the infrared light from the light emitting unit and measures the distance to the subject. As a result, the information processing device can acquire the distance image in a case where the measurement processing can be normally performed.

In addition, the determination unit determines whether or not to perform the measurement processing based on an illuminance of external light received by the light receiving unit. As a result, the information processing device can determine whether or not to acquire the distance image in consideration of an external light resistance of the TOF camera.

The determination unit determines whether or not to perform the measurement processing based on a result of analyzing an image acquired by the image acquisition unit. As a result, the information processing device can determine whether or not to acquire the distance image in consideration of the external light resistance of the TOF camera without measuring the illuminance.

In addition, the determination unit determines whether or not to perform the measurement processing based on the remaining amount of power that can be supplied by the battery. As a result, the information processing device can determine whether or not to acquire the distance image in consideration of power necessary for the subject recognition processing.

Furthermore, the determination unit determines whether or not to perform the measurement processing based on the use purpose of the result of the subject recognition processing of the application. As a result, the information processing device can determine whether or not to acquire the distance image in consideration of the recognition accuracy required for the subject recognition processing.

Furthermore, the recognition processing unit performs the recognition processing based on the first image in a case where the determination unit determines to perform the measurement processing, and performs the recognition processing based on the second image in a case where the determination unit determines not to perform the measurement processing. As a result, the information processing device can selectively use the recognition processing based on the first image (distance image) and the recognition processing based on the second image (luminance image) depending on the situation.

In addition, the recognition processing unit acquires an absolute feature point position of the subject based on a relative feature point position of the subject estimated based on the second image and a three-dimensional model of the subject generated in advance based on the result of the measurement processing performed by the measurement unit. As a result, the recognition performance of the recognition processing based on the second image (luminance image) can be improved.

Furthermore, the recognition processing unit acquires the absolute feature point position of the subject based on a feature point position of the subject estimated based on the second image and a distance to a feature point of the subject obtained from the result of the measurement processing performed by the measurement unit on the first image acquired at a time closest to a time at which the second image is acquired. As a result, the recognition performance of the recognition processing based on the second image (luminance image) can be improved.

Although the embodiments and modified examples of the present disclosure have been described above, the technical scope of the present disclosure is not limited to the above-described embodiments and modified examples, and various modifications can be made without departing from the scope of the present disclosure. Moreover, components of different embodiments and modified examples may be appropriately combined.

Furthermore, the effects described in the present specification are merely illustrative or exemplary and are not restrictive. That is, the technology of the present disclosure can exhibit, in addition to or in place of the above-described effects, other effects obvious to those skilled in the art from the description of the present specification.

Note that the technology of the present disclosure can also have the following configurations within the technical scope of the present disclosure.

(1)
An information processing device including:
an image acquisition unit that acquires an image by receiving external light by a light receiving unit;
a measurement unit that measures a distance to a subject by using a first image based on an image acquired by the image acquisition unit in response to emission of infrared light from a light emitting unit; and
a recognition processing unit that performs subject recognition processing by using a second image based on an image acquired by the image acquisition unit that has received external light without the infrared light emitted from the light emitting unit.

(2)
The information processing device according to (1), further including
a determination unit that determines whether or not to perform measurement processing by the measurement unit, wherein the measurement unit
performs the measurement processing in a case where the determination unit determines to perform the measurement processing.

(3)
The information processing device according to (2),
wherein the determination unit
determines whether or not to perform the measurement processing based on an illuminance of the external light received by the light receiving unit.

(4)
The information processing device according to (2),
wherein the determination unit
determines whether or not to perform the measurement processing based on a result of analyzing the first image or the second image.

(5)
The information processing device according to (4),
wherein the determination unit
determines whether or not to perform the measurement processing based on a remaining amount of power that is suppliable by a battery.

(6)
The information processing device according to (4) or (5),
wherein the determination unit
determines whether or not to perform the measurement processing based on a use purpose of a result of the recognition processing of an application.

(7)
The information processing device according to any one of (2) to (6),
wherein the recognition processing unit
performs the recognition processing based on the first image in a case where the determination unit determines to perform the measurement processing, and performs the recognition processing based on the second image in a case where the determination unit determines not to perform the measurement processing.

(8)
The information processing device according to (1),
wherein the recognition processing unit
acquires an absolute feature point position of the subject based on a relative feature point position of the subject estimated based on the second image and a three-dimensional model of the subject generated in advance based on a result of the measurement processing performed by the measurement unit.

(9)
The information processing device according to (1),
wherein the recognition processing unit
acquires an absolute feature point position of the subject based on a feature point position of the subject estimated based on the second image and a distance to a feature point of the subject obtained from a result of measurement processing performed by the measurement unit on the first image acquired at a time closest to a time at which the second image is acquired.

(10)
An information processing method executed by a processor, the information processing method including:
acquiring an image by receiving external light;
measuring a distance to a subject by using a first image based on an image acquired in response to emission of infrared light; and
performing subject recognition processing by using a second image based on an image acquired by receiving external light without emission of the infrared light.

23

(11)

An information processing program that causes a processor to perform:

acquiring an image by receiving external light;

measuring a distance to a subject by using a first image based on an image acquired in response to emission of infrared light; and performing subject recognition processing by using a second image based on an image acquired by receiving external light without emission of the infrared light.

REFERENCE SIGNS LIST 100, 200, 300 INFORMATION PROCESSING DEVICE
110, 210, 310 IMAGE ACQUISITION UNIT
111, 211, 311 LIGHT EMITTING UNIT
112, 212, 312 LIGHT RECEIVING UNIT
120, 220, 320 INPUT UNIT
130, 230, 330 OUTPUT UNIT
140, 240, 340 COMMUNICATION UNIT
150, 250, 350 ILLUMINANCE ACQUISITION UNIT
160, 260, 360 STORAGE UNIT
170, 270, 370 CONTROL UNIT
171, 271, 371 DETERMINATION UNIT
172, 272, 372 IMAGE PROCESSING UNIT
173, 273, 373 RECOGNITION PROCESSING UNIT
174, 274, 374 APPLICATION EXECUTION UNIT
261 THREE-DIMENSIONAL MODEL STORAGE UNIT
361 DISTANCE IMAGE STORAGE UNIT
362 LUMINANCE IMAGE STORAGE UNIT

The invention claimed is:

1. An information processing device, comprising:
a camera that includes a light emitting diode (LED) and an image sensor, wherein
the image sensor is configured to receive external light,
the camera is configured to acquire a first image based on the received external light,
the LED is configured to emit infrared light, and
the camera is configured to acquire a second image based on the emitted infrared light; and
a central processing unit (CPU) configured to:
determine an illuminance of the external light is one of:
equal to or greater than a threshold, or
less than the threshold;
generate a third image from the second image;
perform a measurement process, based on the generated third image and the determination that the illuminance of the external light is less than the threshold, to measure a distance to a subject;
generate a fourth image from the first image; and
perform a subject recognition process based on the generated fourth image and the determination that the illuminance of the external light is equal to or greater than the threshold.

2. The information processing device according to claim 1, wherein the CPU is further configured to perform the measurement process based on an analysis result of the third image.

3. The information processing device according to claim 2, further comprising a battery configured to supply a remaining amount of power, wherein
the CPU is further configured to perform the measurement process based on the remaining amount of the power.

4. The information processing device according to claim 3, wherein the CPU is further configured to:

transmit use purpose information indicating a use purpose of a subject recognition result of the subject recognition process; and
perform the measurement process based on the transmitted use purpose information.

5. The information processing device according to claim 1, wherein the CPU is further configured to perform the subject recognition process based on the generated third image and the determination that the illuminance of the external light is less than the threshold.

6. The information processing device according to claim 1, wherein the CPU is further configured to:
estimate a relative feature point position of the subject based on the generated fourth image;
generate a three-dimensional model of the subject based on a result of the measurement process; and
acquire an absolute feature point position of the subject based on the estimated relative feature point position of the subject and the generated three-dimensional model of the subject.

7. The information processing device according to claim 1, wherein the CPU is further configured to:
acquire the generated fourth image at a first time;
estimate a feature point position of the subject based on the acquired fourth image;
acquire the third image at a second time closest to the first time at which the fourth image is acquired;
obtain distance information of a feature point of the subject from the acquired third image; and
acquire an absolute feature point position of the subject based on the estimated feature point position of the subject and the obtained distance information of the feature point of the subject.

8. An information processing method, comprising:
in an information processing device that includes a camera and a central processing unit (CPU):
receiving, by an image sensor, external light, wherein the camera includes the image sensor;
acquiring, by the camera, a first image based on the received external light;
emitting, by a light emitting diode (LED), infrared light, wherein the camera includes the LED;
acquiring, by the camera, a second image based on the emitted infrared light;
determining, by the CPU, an illuminance of the external light is one of:
equal to or greater than a threshold, or
less than the threshold;
generating, by the CPU, a third image from the second image;
performing a measurement process, by the CPU, based on the generated third image and the determination that the illuminance of the external light is less than the threshold, to measure a distance to a subject;
generating, by the CPU, a fourth image from the first image; and
performing, by the CPU, a subject recognition process based on the generated fourth image and the determination that the illuminance of the external light is equal to or greater than the threshold.

9. A non-transitory computer-readable medium having stored thereon, computer-executable instructions which, when executed by an information processing device, cause the information processing device to execute operations, the operations comprising:

receiving, by an image sensor, external light, wherein
the information processing device includes a camera
and a central processing unit (CPU), and
the camera includes the image sensor and a light
emitting diode (LED);
acquiring, by the camera, a first image based on the
received external light;
emitting, by the LED, infrared light;
acquiring, by the camera, a second image based on the
emitted infrared light;
determining, by the CPU, an illuminance of the external
light is one of:
equal to or greater than a threshold, or
less than the threshold;
generating, by the CPU, a third image from the second
image;
performing a measurement process, by the CPU, based on
the generated third image and the determination that the
illuminance of the external light is less than the thresh-
old, to measure a distance to a subject;
generating, by the CPU, a fourth image from the first
image; and
performing, by the CPU, a subject recognition process
based on the generated fourth image and the determi-
nation that the illuminance of the external light is equal
to or greater than the threshold.

* * * * *